(12) United States Patent
Cao et al.

(10) Patent No.: US 11,755,271 B2
(45) Date of Patent: Sep. 12, 2023

(54) STITCHING DISPLAY SYSTEM AND IMAGE PROCESSING METHOD OF THE SAME

(71) Applicant: BOE TECHNOLOGY GROUP CO., LTD., Beijing (CN)

(72) Inventors: Dongbo Cao, Beijing (CN); Feng Feng, Beijing (CN); Hua Huang, Beijing (CN); Xingqun Jiang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 127 days.

(21) Appl. No.: 17/376,667

(22) Filed: Jul. 15, 2021

(65) Prior Publication Data
US 2022/0019398 A1    Jan. 20, 2022

(30) Foreign Application Priority Data
Jul. 16, 2020    (CN) .................. 202010688186.X

(51) Int. Cl.
G06F 3/14    (2006.01)
G06T 7/11    (2017.01)
H04N 19/44    (2014.01)

(52) U.S. Cl.
CPC .............. *G06F 3/1446* (2013.01); *G06T 7/11* (2017.01); *H04N 19/44* (2014.11); *G06T 2207/20021* (2013.01)

(58) Field of Classification Search
CPC ......... G06F 3/1446; H04N 19/44; G06T 7/11; G06T 2207/20021
See application file for complete search history.

(56) References Cited

U.S. PATENT DOCUMENTS

| | | | | |
|---|---|---|---|---|
| 2008/0211825 | A1* | 9/2008 | Sunakawa | G06F 3/1446 345/581 |
| 2014/0240201 | A1* | 8/2014 | Takahashi | G09G 5/10 345/1.3 |
| 2015/0091917 | A1* | 4/2015 | Li | G06F 3/1446 345/1.3 |
| 2016/0163018 | A1* | 6/2016 | Wang | G06F 3/1423 345/504 |
| 2016/0335039 | A1* | 11/2016 | Cho | G06F 3/1446 |

* cited by examiner

*Primary Examiner* — Lixi C Simpson
(74) *Attorney, Agent, or Firm* — Dority & Manning, P.A.

(57) ABSTRACT

A stitching display system includes a control device and Q displays, and Q is a positive integer greater than or equal to 2. A image processing method includes: obtaining at least one frame of initial image; splitting each initial image into Q first sub-images according to a resolution of each initial image and an arrangement of the Q displays; outputting the Q first sub-images obtained by splitting each initial image respectively to the Q displays; and displaying a first sub-image obtained by the each display according to a physical resolution of the each display.

16 Claims, 15 Drawing Sheets

STITCHING DISPLAY SYSTEM AND IMAGE PROCESSING METHOD OF THE SAME

CROSS-REFERENCE TO RELATED APPLICATION

This application claims priority to Chinese Patent Application No. 202010688186.X, filed on Jul. 16, 2020, which is incorporated herein by reference in its entirety.

TECHNICAL FIELD

The present disclosure relates to the field of display technologies, and in particular, to a stitching display system and an image processing method of the same.

BACKGROUND

At present, each display in a stitching display system can be used as a single display for displaying images, or it can be stitched with other displays in the stitching display system to form a super-large screen for displaying images. According to different usage requirements, the stitching display system can realize display functions such as large screen display, single-screen splitting display, single-screen independent display, display of any combination, full-screen stitching display, vertical-screen display, and screen-span display, thereby realizing various display plans.

SUMMARY

In a first aspect, an image processing method of a stitching display system is provided. The stitching display system includes a control device and Q displays, and Q is a positive integer greater than or equal to 2. The image processing method comprises: obtaining, by the control device, at least one frame of initial image; splitting, by the control device, each initial image into Q first sub-images according to a resolution of each initial image and an arrangement of the Q displays; outputting, by the control device, the Q first sub-images obtained by splitting each initial image to the Q displays; and displaying, by each display, a first sub-image obtained by the each display according to a physical resolution of the each display.

In some embodiments, the obtaining, by the control device, at least one frame of initial image includes: decapsulating and decoding, by the control device, a video file to read at least one frame of initial image in the video file.

In some embodiments, the splitting, by the control device, each initial image into the Q first sub-images according to the resolution of each initial image and the arrangement of the Q displays includes: splitting, by the control device, each initial image into the Q first sub-images according to the resolution of each initial image and the arrangement of the Q displays, so as to obtain a first sub-image set corresponding to each display, and the first sub-image set corresponding to each display is a set including all first sub-images corresponding to each display of the at least one frame of initial image; and decapsulating and decoding, by the control device, the first sub-image set corresponding to each display to obtain Q sub-video files. The outputting, by the control device, the Q first sub-images obtained by splitting each initial image to the Q displays includes: outputting, by the control device, the Q sub-video files to corresponding displays respectively.

In some embodiments, the displaying, by each display, the first sub-image obtained by the each display according to the physical resolution of the each display includes: decapsulating and decoding, by each display, a received sub-video file to read a plurality of first sub-images in the sub-video file; storing, by each display, first sub-images to be displayed; converting, by each display, resolutions of the stored first sub-images to be displayed according to its own physical resolution, so as to obtain second sub-images and then display them, wherein resolutions of the second sub-images are the same as physical resolutions of corresponding displays.

In some embodiments, the displaying, by each display, the first sub-image obtained by the each display according to the physical resolution of the each display includes: directly displaying, by any of the Q displays, a first sub-image obtained by the any of the Q displays in a case where a resolution of the obtained first sub-image is same as a physical resolution of the any of the Q displays; or, performing, by the any of the Q displays, resolution conversion on the obtained first sub-image according to the physical resolution of the any of the Q displays to obtain a second sub-image in a case where the resolution of the obtained first sub-image is different from the physical resolution of the any of the displays, wherein a resolution of the second sub-image is same as the physical resolution of the any of the Q displays; and displaying, by the any of the Q displays, the second sub-image.

In some embodiments, the performing, by the any of the Q displays, the resolution conversion on the obtained first sub-image according to the physical resolution of the any of the Q displays includes: storing, by the any of the Q displays, the obtained first sub-image in a frame buffer memory; and performing, by the any of the Q displays, the resolution conversion on the stored first sub-image according to the physical resolution of the any of the Q displays.

In some embodiments, the performing, by the any of the Q displays, the resolution conversion on the obtained first sub-image according to the physical resolution of the any of the Q displays includes: performing, by the any of the Q displays, the resolution conversion on an effective region of the obtained first sub-image according to the physical resolution of the any of the Q displays.

In some embodiments, the resolution of the obtained first sub-image is M×N, and the physical resolution of the any of the Q displays is $M_0 \times N_0$; and the performing, by the any of the Q displays, the resolution conversion on the obtained first sub-image according to the physical resolution of the any of the Q displays includes: if M is greater than or equal to $M_0(M \geq M_0)$ and N is greater than or equal to $N_0(N \geq N_0)$, calculating R1 and R2, and rounding R1 and R2 to obtain R1' and R2'; and R1 being equal to $$\frac{M}{M_0}\left(R1 = \frac{M}{M_0}\right),$$

and R2 being equal to $$\frac{N}{N_0}\left(R2 = \frac{N}{N_0}\right);$$

dividing pixels in the obtained first sub-image based on R1' and R2', so as to obtain $M_0 \times N_0$ pixel groups; obtaining $M_0 \times N_0$ pieces of second pixel data according to the $M_0 \times N_0$ pixel groups of first pixel data, so as to obtain the second sub-image; wherein, one pixel group of first pixel data corresponds to one piece of second pixel data; and at least one of the pixel groups includes R1'×R2' adjacent pixels.

In some embodiments, the dividing the pixels in the obtained first sub-image based on R1' and R2' to obtain the $M_0 \times N_0$ pixel groups includes: in a case where R1' is equal to R1 (R1'=R1), and R2' is equal to R2 (R2'=R2), dividing all pixels in the obtained first sub-image into the $M_0 \times N_0$ pixel groups; and in a case where R1' is not equal to R1 (R1'≠R1) and/or R2' is not equal to R2 (R2'≠R2), performing image processing on the obtained first sub-image according to a predetermined processing mode, and dividing all pixels in the processed first sub-image into the $M_0 \times N_0$ pixel groups; wherein the predetermined processing mode includes at least one of following: adding virtual pixel data into the obtained first sub-image, or, reducing pixel data in the obtained first sub-image.

In some embodiments, the obtaining $M_0 \times N_0$ pieces of second pixel data according to the $M_0 \times N_0$ pixel groups of first pixel data includes at least one of following: selecting first pixel data of one pixel from a pixel group as a piece of second pixel data corresponding the pixel group; or, using a weighted average of first pixel data of all pixels in a pixel group as a piece of second pixel data corresponding the pixel group.

In some embodiments, the resolution of the obtained first sub-image is M×N, and the physical resolution of the any of the Q displays is $M_0 \times N_0$; and the performing, by the any of the Q displays, the resolution conversion on the obtained first sub-image according to the physical resolution of the any of the Q displays includes: if M is less than $M_0$ (M<$M_0$) and N is less than $N_0$ (N<$N_0$), expanding M rows of first pixels in the obtained first sub-image to $M_0$ rows of second pixels, and expanding N columns of first pixels in the obtained first sub-image to $N_0$ columns of second pixels.

In some embodiments, the expanding the M rows of first pixels in the obtained first sub-image to the $M_0$ rows of second pixels includes: calculating D1, and rounding D1 to obtain D1', and D1 being equal to $$\frac{M_0}{M}\left(D1 = \frac{M_0}{M}\right);$$

in a case where D1 is equal to D1' (D1=D1'), inserting (D1'−1) newly-added pixels before or after each first pixel in each column, and the $M_0$ rows of second pixels including M rows of first pixels and ($M_0$−M) rows of newly-added pixels; in a case where D1 is not equal to D1' (D1≠D1') and D1 is rounded up to obtain D1', inserting (D1'−1) newly-added pixels before or after each of A1 first pixels in each column; A1=($M_0$−M)/(D1'−1), and the $M_0$ rows of second pixels including M rows of first pixels and ($M_0$−M) rows of newly-added pixels; in a case where D1 is not equal to D1' (D1≠D1') and D1 is rounded down to obtain D1', inserting ($M_0$−M×D1') virtual pixels before a first pixel at beginning in each column or after a first pixel at last in each column, pixel data of the virtual pixels being same as pixel data of a first pixel which is most proximate to the virtual pixels or being 0; and inserting (D1'−1) newly-added pixels before or after each first pixel in each column; and the $M_0$ rows of second pixels including M rows of first pixels, ($M_0$−M×D1') rows of virtual pixels, and (M×D1'−M) rows of newly-added pixels; and any of the newly-added pixels being obtained based on any of following: pixel data of a first pixel corresponding to the any of the newly-added pixels, or a weighted average of pixel data of two adjacent first pixels corresponding to the any of the newly-added pixels.

In some embodiments, the expanding the N columns of first pixels in the obtained first sub-image to the $N_0$ columns of second pixels includes: calculating D2, and rounding D2 to obtain D2', and D2 being equal to $$\frac{N_0}{N}\left(D2 = \frac{N_0}{N}\right);$$

in a case where D2 is equal to D2' (D2=D2'), inserting (D2'−1) newly-added pixels before or after each first pixel in each row, and the $N_0$ columns of second pixels including N columns of first pixels and ($N_0$−N) columns of newly-added pixels; in a case where D2 is not equal to D2' (D2 $ D2') and D2 is rounded up to obtain D2', inserting (D2'−1) newly-added pixels before or after each of A2 first pixels in each row; A2=($N_0$−N)/(D2'−1), and the $N_0$ columns of second pixels including N columns of first pixels and ($N_0$−N) columns of newly-added pixels; in a case where D2 is not equal to D2' (D2≠D2') and D2 is rounded down to obtain D2', inserting ($N_0$−N×D2') virtual pixels before a first pixel at beginning in each row or after a first pixel at last in each row, pixel data of the virtual pixels being same as pixel data of a first pixel which is most proximate to the virtual pixels or being 0; and inserting (D2'−1) newly-added pixels before or after each first pixel in each row; and the $N_0$ columns of second pixels includes N columns of first pixels, ($N_0$−N× D2') columns of virtual pixels, and (N×D2'−N) columns of newly-added pixels; and any of the newly-added pixels being obtained based on any of following: pixel data of a first pixel corresponding to the any of the newly-added pixels, or a weighted average of pixel data of two adjacent first pixels corresponding to the any of the newly-added pixels.

In a second aspect, a stitching display system is provided. The stitching display system comprises a control device and Q displays, and Q being a positive integer greater than or equal to 2. The control device being configured to: obtain at least one frame of initial image; split each initial image into Q first sub-images according to a resolution of each initial image and an arrangement of the Q displays; and output the Q first sub-images obtained by splitting each initial image respectively to the Q displays; and each display being configured to display a first sub-image obtained by the each display according to a physical resolution of the each display.

In some embodiments, the control device is further configured to decapsulate and decode a video file to read at least one frame of initial image in the video file.

In some embodiments, the control device is further configured to: split each initial image into the Q first sub-images according to the resolution of the each initial image and the arrangement of the Q displays, so as to obtain a first sub-image set corresponding to each display, and the first sub-image set corresponding to each display is a set including all first sub-images corresponding to each display of the at least one frame of initial image; decapsulate and decode the first sub-image set corresponding to each display to obtain Q sub-video files; and output the Q sub-video files to corresponding displays respectively.

In some embodiments, a display is further configured to: directly display a first sub-image obtained by the display in a case where a resolution of the obtained first sub-image is same as a physical resolution of the display; or perform resolution conversion on the obtained first sub-image according to the physical resolution of the display to obtain a second sub-image in a case where the resolution of the obtained first sub-image is different from the physical resolution of the display, wherein a resolution of the second sub-image is same as the physical resolution of the display; and display the second sub-image.

In some embodiments, the display is further configured to: store the obtained first sub-image a frame buffer memory; and perform the resolution conversion on the stored first sub-image according to the physical resolution of the display.

In some embodiments, the resolution of the obtained first sub-image is M×N, and the physical resolution of the display is $M_0 \times N_0$; and the display is further configured to: if M is greater than or equal to $M_0 (M \geq M_0)$ and N is greater than or equal to $N_0 (N \geq N_0)$, calculate R1 and R2, and round R1 and R2 to obtain R1' and R2'; and R1 being equal to $$\frac{M}{M_0}\left(R1 = \frac{M}{M_0}\right),$$

and R2 being equal to $$\frac{N}{N_0}\left(R2 = \frac{N}{N_0}\right);$$

divide pixels in the obtained first sub-image based on R1' and R2' to obtain $M_0 \times N_0$ pixel groups; obtain $M_0 \times N_0$ pieces of second pixel data according to the $M_0 \times N_0$ pixel groups of first pixel data, so as to obtain the second sub-image; wherein, one pixel group of first pixel data corresponds to one piece of second pixel data; and at least one of the pixel groups includes R1'×R2' adjacent pixels.

In a third aspect, a non-stationary computer readable storage medium is provided. The non-stationary computer readable storage medium stores computer instructions, wherein when the computer instructions are executed, the image processing method of the stitching display system according to claim 1 is performed.

BRIEF DESCRIPTION OF THE DRAWINGS

In order to describe technical solutions in embodiments of the present disclosure, accompanying drawings to be used in the embodiments or prior art will be briefly introduced below. Obviously, the accompanying drawings to be described below are merely some embodiments of the present disclosure, and a person of ordinary skill in the art may obtain other drawings according to these drawings without paying any creative effort.

DETAILED DESCRIPTION

Figure 1A:
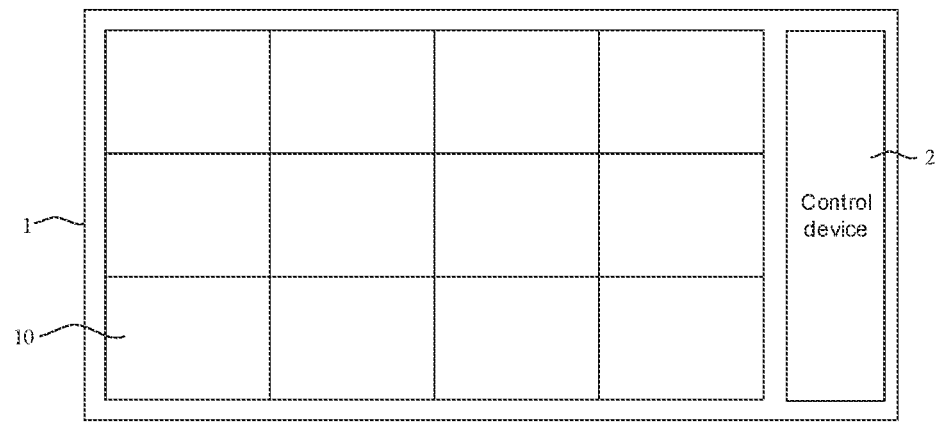
FIG. 1A is a structural diagram of a stitching display system, in accordance with some embodiments of the present disclosure.

The technical solutions in embodiments of the present disclosure will be described clearly and completely in combination with the accompanying drawings in the embodiments of the present disclosure. Obviously, the described embodiments are merely some but not all of the embodiments of the present disclosure. All other embodiments obtained based on the embodiments of the present disclosure by a person of ordinary skill in the art without paying any creative effort shall be included in the protection scope of the present disclosure.

It will be noted that unless otherwise defined, the technical terms or scientific terms used in the embodiments of the present disclosure should have the ordinary meanings understood by a person of ordinary skill in the art to which the present disclosure pertains. The "first", "second" and similar words used in the present disclosure do not indicate any order, quantity or importance, but are only used to distinguish different components.

"A and/or B" includes the following three combinations: only A, only B, and a combination of A and B.

The use of "configured to" herein is meant as open and inclusive language that does not foreclose devices adapted to or configured to perform additional tasks or steps.

Image processing technology is a technology that uses digital processing technology to apply certain operations and processing to images to extract various pieces of information in the images, thereby achieving a specific purpose. In the field of display technologies, a processor in a display undertakes a task of processing images.

For example, the following image processing will be performed in a stitching display system.

When displaying an initial image on a plurality of displays, the stitching display system will split the initial image according to a resolution of the initial image, a number and an arrangement of the plurality of displays, and a physical resolution of each display, so as to obtain a plurality of sub-images. The above-mentioned initial image is an image that needs to be displayed on the plurality of displays simultaneously. It will be understood that images displayed on the plurality of displays collectively constitute the initial image or roughly constitute the initial image.

Since a general display does not have a function of converting a resolution of a sub-image, it cannot display a sub-image with a resolution different from its physical resolution. Therefore, when physical resolutions of part or all of the displays are not completely the same, there is a need to obtain, according to the physical resolution of each display, sub-images with resolutions same as the physical resolutions of the displays when the initial image is split. In this way, after each display receives the sub-image, since the resolution of the sub-image is the same as the resolution of the display, the display can directly display the sub-image. When the physical resolutions of each display are the same, the resolutions of the sub-images obtained when the initial image is split are also the same as the physical resolution of the display, and the sub-images will be displayed directly.

However, the stitching display system needs to split the initial image according to the number, arrangement and physical resolutions of the displays, and because the displays in the stitching display system does not have the function of converting the resolutions of the sub-images, a splitting process of the initial image is caused to be relatively complicated.

To this end, referring to FIG. 1A, some embodiments of the present disclosure provide a stitching display system 1. The stitching display system 1 includes a control device 2 and Q displays 10, and Q is greater than or equal to 2 (Q≥2) and is an integer. The control device 2 is configured to control the Q displays 10 and communicates with the Q displays 10. The control device 2 and the displays 10 may be connected through a wired communication mode or a wireless communication mode.

The control device 2 includes, for example, a first processor, a first memory, and a first communication device.

The first processor may be one or more of general central processing unit (CPU), microprocessor, application-specific integrated circuit (ASIC), or integrated circuit which is used to control program execution of some embodiments of the present disclosure. A CPU may be a single-CPU or a multi-CPU. A processor herein may refer to one or more devices, circuits, or processing cores for processing data (for example, computer program instructions).

The first memory may store computer programs and data, and may include a high-speed random access memory, and may also include a non-volatile memory, such as a magnetic disk storage device, a flash memory device, or other volatile solid-state storage devices.

The first communication device is a device that performs information interaction with external devices (for example, the Q displays 10), and is connected to one or more (at least two) processors including the first processor, so as to send data or commands to the external devices under the control of the one or more processors, or receive data or commands sent by the external devices. The first communication device may be a transceiver, a transceiver circuit, a transmitter, a receiver, etc.; for example, it may be a wireless communication device such as a wireless-fidelity (Wi-Fi) device, a Bluetooth device, a communication device of 3rd generation mobile communication technology (3G), a communication device of 4th generation mobile communication technology (4G), a communication device of 5th generation mobile communication technology (5G), or a communication module of ultra-long-distance wireless transmission based on spread spectrum technology (Lora), or it may be a wired communication device such as a universal serial bus (USB) interface. The Wi-Fi device provides the stitching display system 1 with network access that follows Wi-Fi related standard protocols. The Bluetooth device may be an integrated circuit or a Bluetooth chip or the like.

The display 10 includes, for example, a second processor, a second memory, a second communication device, and a frame buffer memory. Explanations of the second processor, the second memory, and the second communication device may refer to the above explanations of the first processor, the first memory, and the first communication device, so they will not be repeated here. The frame buffer memory is a direct mapping of an image displayed on a display, and is also referred to as a bit map. Each storage unit of a frame buffer memory corresponds to a pixel in the display, and the entire frame buffer memory corresponds to a frame.

The display 10 is, for example, a light-emitting diode (LED) display, a liquid crystal display (LCD), an organic light-emitting diode (OLED) display, and a quantum dot light-emitting diode (QLED) display.

Figure 1B:
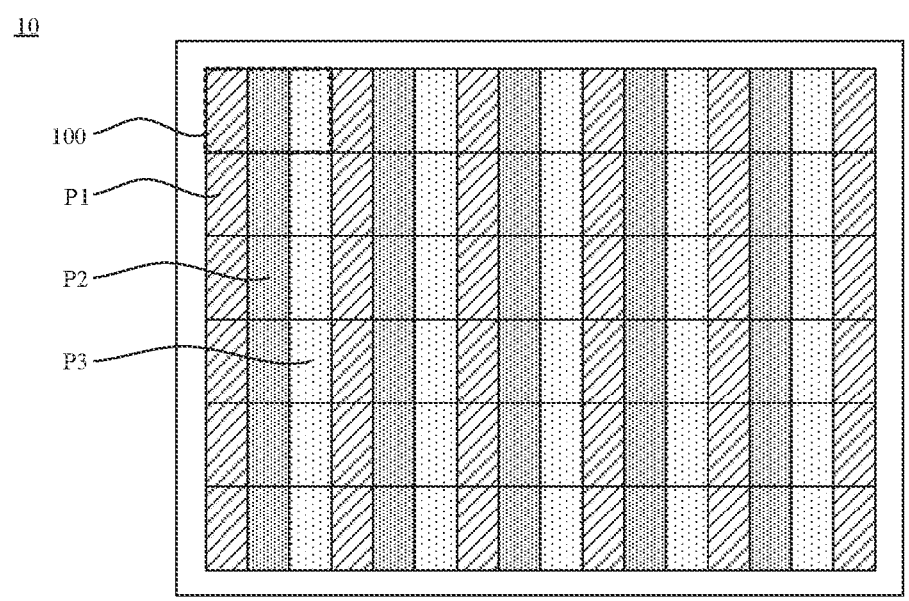
FIG. 1B is a structural diagram of a display, in accordance with some embodiments of the present disclosure.

Referring to FIG. 1B, a display 10 is, for example, an OLED display. The OLED display includes a plurality of pixels 100. Each pixel 100 includes at least a first color sub-pixel P1, a second color sub-pixel P2, and a third color sub-pixel P3. A first color, a second color, and a third color are, for example, three primary colors, and the three primary colors are, for example, red, green, and blue.

For example, the OLED display includes a plurality of light-emitting devices arranged in an array, and each light-emitting device corresponds to a sub-pixel.

In some embodiments, light colors of the plurality of light-emitting devices include at least three colors, and the light colors of the plurality of light-emitting devices are the same as the colors of the corresponding sub-pixels, that is, a light-emitting device of the first color corresponds to a sub-pixel of the first color, a light-emitting device of the second color corresponds to a sub-pixel of the second color, and a light-emitting device of the third color corresponds to a sub-pixel of the third color.

In some other embodiments, the light colors of the plurality of light-emitting devices are the same, that is, light emitted from the plurality of light-emitting devices is light of a single color, for example, all are white light or all are blue light. In this structure, a display 10 includes a filter layer used to convert light of a single color into light of three primary colors.

Figure 2:
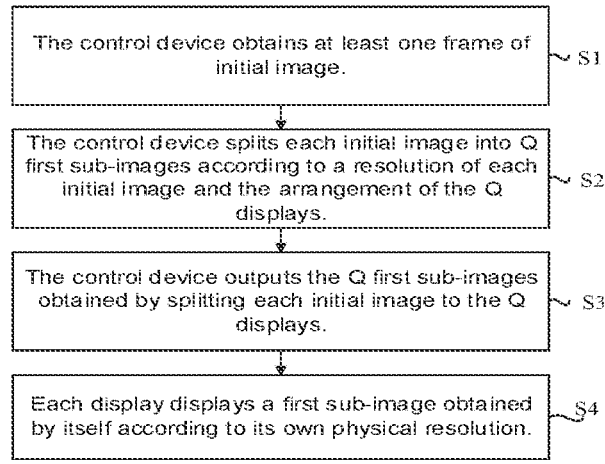
FIG. 2 is a flow diagram of an image processing method of a stitching display system, in accordance with some embodiments of the present disclosure.

On this basis, referring to FIG. 2, an image processing method of the stitching display system includes steps 1 to 4 (S1 to S4).

In S1, the control device obtains at least one frame of initial image.

In some embodiments of the present disclosure, an initial image is an image that needs to be displayed on the Q displays simultaneously. It will be understood that images displayed on the Q displays collectively constitute the initial image or roughly constitute the initial image.

In some embodiments of the present disclosure, the initial image may be stored in a memory. For example, the memory may be the first memory in the stitching display system 1 or an external memory connected to the stitching display system 1 through an interface, for example, a USB flash disk.

In S2, the control device splits each initial image into Q first sub-images according to a resolution of each initial image and the arrangement of the Q displays.

In some embodiments of the present disclosure, assuming that the arrangement of the Q displays is s×t (s is a number of rows, t is a number of columns, s and t are both positive integers, and a product of s and t is Q (s×t=Q)), then, an initial image needs to be split into s×t first sub-images. A resolution of each first sub-image is related to a resolution of a corresponding initial image. It will be noted that resolutions of the s×t first sub-images may be the same or different.

In some possible examples of the present disclosure, in a case where the resolutions of the Q first sub-images are the same, assuming that a resolution of one initial image is $M_{00} \times N_{00}$, a resolution of each first sub-image split from the initial image may be expressed as $$\frac{M_{00}}{s} \times \frac{N_{00}}{t}.$$

For example, assuming that the resolution of the initial image is 640×480 and Q is a product of 2 and 4 (Q=2×4), the initial image needs to be split into 2×4 first sub-images, and a resolution of each first sub-image may be 320×120.

In some possible examples of the present disclosure, in a case where the resolutions of the Q first sub-images are different, when the control device splits an initial image into the Q first sub-images, the resolutions of some first sub-images may be assigned to be relatively large, and resolutions of the other first sub-images may be assigned to be relatively small.

In some embodiments of the present disclosure, that the control device splitting the initial image is only related to the resolution of the initial image and the arrangement of the Q displays.

In S3, the control device outputs the Q first sub-images obtained by splitting each initial image to the Q displays.

In some embodiments of the present disclosure, the Q first sub-images obtained by splitting one initial image is in a one-to-one correspondence with the Q displays, that is, one first sub-image of one initial image corresponds to one display.

In some embodiments of the present disclosure, in a process where the control device outputs the first sub-images to the displays, the control device may first store the first sub-images, and then output the first sub-images to the displays. In this way, it is possible to avoid a problem of loss of one or some first sub-images caused by a failure of receiving the first sub-images due to abnormality of one or some displays.

In some possible examples, the control device may sequentially store the first sub-images in the memory according to the arrangement of the displays. The memory may be the first memory in the stitching display system 1.

In some possible examples, after splitting a plurality of initial images, the control device may store the plurality of first sub-images corresponding to each display together, and then send the plurality of first sub-images to a corresponding display. In this way, a number of communications between the control device and the displays may be reduced, and an influence of communication instability on data transmission efficiency may be reduced, thereby ensuring communication quality between the control device and the displays.

In some embodiments of the present disclosure, the control device may also directly transmit the first sub-images to the displays without going through the process of storing the first sub-images. That is, the control device outputs the first sub-images to the displays while splitting the initial image, so that the control device saves time for storing the first sub-images. As a result, real-time communication between the control device and the displays is realized, and transmission rate of data is improved.

Based on the above content, no matter that the control device outputs the first sub-images to the displays while splitting the initial image, or splits all the initial images and then stores the first sub-images corresponding to a same display in sequence and finally transmits all the first sub-images corresponding to the same display to this display, both of them can realize transmission of data to the display, and the transmission process is relatively simple.

In S4, each display displays a first sub-image obtained by itself according to its own physical resolution.

In some embodiments of the present disclosure, when splitting the initial image, the control device splits it according to the number and the arrangement of the Q displays, so that the resolutions of the plurality of first sub-images finally obtained may be the same, and may also be different. However, whether the resolutions of the plurality of first sub-images are the same or different, the resolutions of the plurality of first sub-images have no correspondence with the physical resolutions of the displays. In other words, the resolution of the first sub-image received by each display and the physical resolution of the each display are not necessarily equal.

Based on the above content, it will be understood that the resolutions of the plurality of first sub-images received by the same display are the same or may be different; the resolutions of the plurality of first sub-images received by the same display may be or may not be equal to the physical resolution of the display; and the resolutions of the first sub-images received by different displays may be the same or different.

In some embodiments of the present disclosure, a resolution of a first sub-image received by a display is not necessarily the same as a physical resolution of the display, and the display is unable to display a first sub-image with a resolution different from its own physical resolution. Therefore, when the display receives the first sub-image with the resolution different from its own physical resolution, the display needs to first convert the resolution of the first sub-image to obtain an image with a resolution same as the physical resolution of the display before performing the display.

In some embodiments of the present disclosure, since the control device does not split the initial image according to the physical resolutions of each display, a display may need to first convert a resolution of a first sub-image to obtain a second image with a resolution same as the physical resolution of the display, so that normal display can be performed. When a display has a function of converting a resolution of an image, it can receive images with a variety of resolutions, so that the versatility and applicability of the display can be improved.

In some embodiments of the present disclosure, S4 may include step 41 or 42 (S41 or S42) as below.

In S41, if a resolution of a first sub-image obtained by any of the Q displays is the same as a physical resolution of the any of the displays, the any of the displays directly displays the obtained first sub-image.

In S42, if the resolution of the first sub-image obtained by any of the Q displays is different from the physical resolution of the any of the displays, the any of the displays performs resolution conversion on the obtained first sub-image according to its own physical resolution to obtain a second sub-image with a resolution same as the physical resolution of the any of the display, and display the obtained second sub-image.

In some possible examples, in a case where a resolution of a first sub-image is the same as a physical resolution of a corresponding display, the display may directly display the first sub-image. It will be noted that this process may also be understood as performing an image conversion on the first sub-image in a form of 1:1, so as to obtain a second sub-image; and 1:1 may be understood as taking a pixel in the first sub-image as a pixel in the second sub-image.

In some possible examples, in a case where a resolution of a first sub-image is different from a physical resolution of a corresponding display, the display may, for example, enlarge or reduce the resolution of the first sub-image by a certain ratio when converting the resolution of the first sub-image.

In some possible examples, after each first sub-image is output to its corresponding display, and when the display displays the each first sub-image, it will determine whether to convert the resolution of the first sub-image based on its own physical resolution and the resolution of the first sub-image it receives, so that the resolution of the obtained second sub-image after an image conversion is equal to the physical resolution of the display, and the second sub-image may be normally displayed on the display. That is to say, in a case where a resolution of a first sub-image is different from a physical resolution of a display, the display must have the function of converting the resolution of the first sub-image to obtain a second sub-image such that the first sub-image is displayed normally, and finally, the converted second sub-images displayed by the Q displays may be stitched into an initial image or roughly stitched into the initial image. The physical resolutions of the Q displays may be the same or different.

In combination with the above description, it will be seen that the stitching display system 1 in some embodiments of the present disclosure does not need to split an initial image according to the physical resolutions of the Q displays when the initial image is split, so that the splitting process of the initial image is simple and convenient. It will be understood that there is no need to take the physical resolutions of the displays into consideration when the stitching display system 1 splits an image. Compared with a stitching display system which needs to take the physical resolutions of the displays into consideration when splitting an initial image, the stitching display system 1 in some embodiments of the present disclosure has a higher image processing efficiency.

Based on the image processing technologies adopted by the above two stitching display systems, when the two stitching display systems are used to display video files, their respective display processes are as follows.

Figure 3:
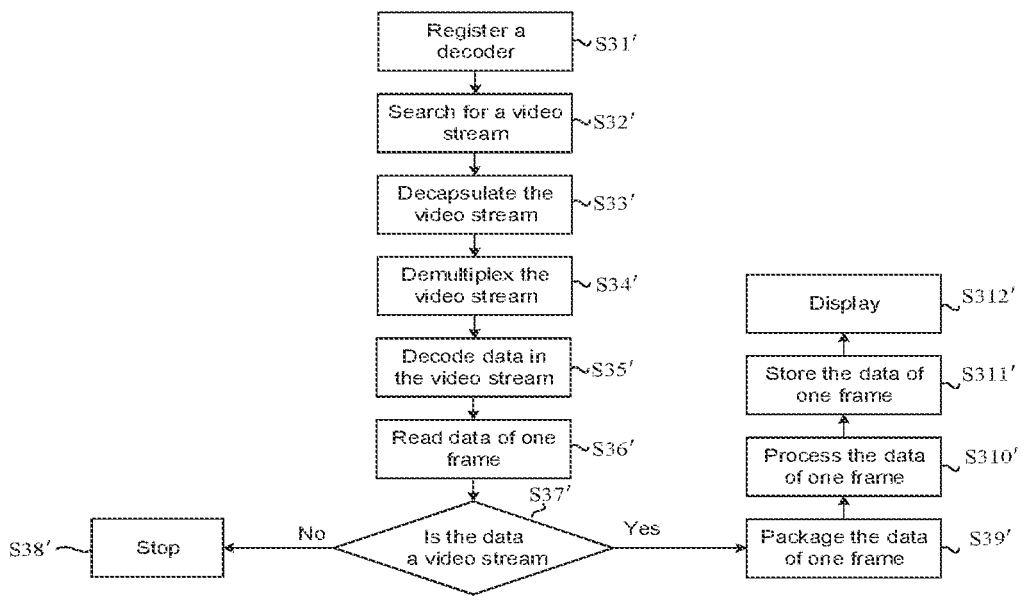
FIG. 3 is a flow diagram of a display process of a video stream, in accordance with a related art.

For example, referring to FIG. 3, in the stitching display system which needs to take the physical resolutions of the displays into consideration when splitting an initial image, when a display is displaying a video file, a display process is as follows.

In step 31' (S31'), a decoder is registered.

A decoder that may be used to decode a video file is registered. The video file includes, for example, a video stream and audio data: and the video stream includes data of a plurality of frames.

In step 32' (S32'), a video stream is searched.

The video stream is searched in the video file.

In step 33' (S33'), the video stream is decapsulated by the decoder.

The video stream is decapsulated, that is, an encapsulation format of the video stream is decapsulated according to a predetermined decapsulation manner.

An encapsulation format of the video steam is, for example, MPEG-4 Part 14 (mp4), quick time (mov), and windows media video (wmv). Different encapsulation formats correspond to different decoders.

In step 34' (S34'), the video stream is demultiplexed by the decoder.

Data in the video stream is demultiplexed.

In step 35' (S35'), data in the video stream is decoded by the decoder.

In step 36' (S36'), data of one frame is read.

Data of one frame is read from the data in a decoded video stream.

The data of each frame included in the video stream opened by a display is data of a sub-image, and the sub-image is obtained by splitting an initial image.

In step 37' (S37'), whether the read data is a video stream is determined.

Since the video file also includes the audio data, it is necessary to confirm whether the data read in S36' is really a video stream, instead of misreading the audio data.

That whether the read data is a video stream is determined, if not, step 38' (S38') is performed, and if yes, step 39' (S39') is performed.

In S38', if the read data is not the video stream, the process is stopped.

If the read data is not the data of the video stream, the audio data in the video file may be read by mistake, so the display will not be possible and the process needs to be stopped.

In S39', if the read data is the video stream, the data of one frame is packaged.

If the read data is the video stream, it means that the data is read correctly, so that the data of the one frame is stored in the memory in a form of a data packet.

In step 310' (S310'), the data of one frame is processed.

A proceed process of the data packet is performed, for example, copying, based on the data packet of one frame.

In step 311' (S311'), the data of one frame is stored.

For example, the display stores the processed data of one frame in a frame buffer.

In S312', display is performed.

For example, the display displays an image based on the data of one frame stored in the memory for displaying the image. It will be noted that when the plurality of displays are applied to the stitching display system, an image displayed on each display is a portion of an initial image, and the images displayed on all the displays constitute or roughly constitute the initial image.

It will be seen from the above process that in the stitching display system which needs to take the physical resolutions of the displays into consideration when splitting an initial image, a display directly reads data of one frame (for example, a sub-image obtained by splitting an initial image) from a memory for displaying the sub-image, and all processing on the frame does not include conversion of a resolution. Therefore, the display does not have the function of converting the resolution of the sub-image, and can only display a sub-image with a resolution same as its own physical resolution.

In some embodiments of the present disclosure, in an aspect, when the control device in the stitching display system 1 splits an initial image, it splits the initial image according to the resolution of the initial image, and the number and the arrangement of the Q displays, so as to obtain Q first sub-images, and then respectively output the Q first sub-images to a display corresponding to each first sub-image. The control device does not need to split the initial image according to the physical resolutions of the Q displays when splitting the initial image, this not only reduces a difficulty of the control device splitting the initial image, but also reduces performance requirements for the processor in the control device. In another aspect, at least one of the Q displays in the stitched display system 1 has the function of converting the resolution of at least one of the Q first sub-images, and the image processing function of the stitched display system 1 is enhanced, thereby normal display of the Q first sub-images ensured.

For a scenario in which there is no need to take the physical resolution of each display into consideration when the initial image is split, in a stitched display system 1 in some embodiments of the present disclosure, a display process of a display displaying a video file is as follows.

Figure 4:
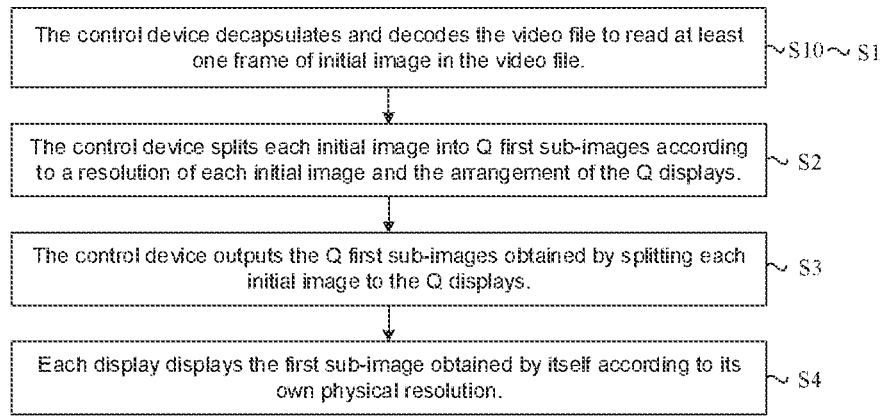
FIG. 4 is a flow diagram of another image processing method of a stitching display system, in accordance with some embodiments of the present disclosure.

In some embodiments of the present disclosure, referring to FIG. 4, that the control device obtains at least one frame of initial image in S1 includes step 10 (S10).

In S10, the control device decapsulates and decodes the video file to read at least one frame of initial image in the video file.

For example, the control device needs to sequentially read a plurality frame of initial images included in the video file, so as to prepare for subsequent video display.

Figure 5:
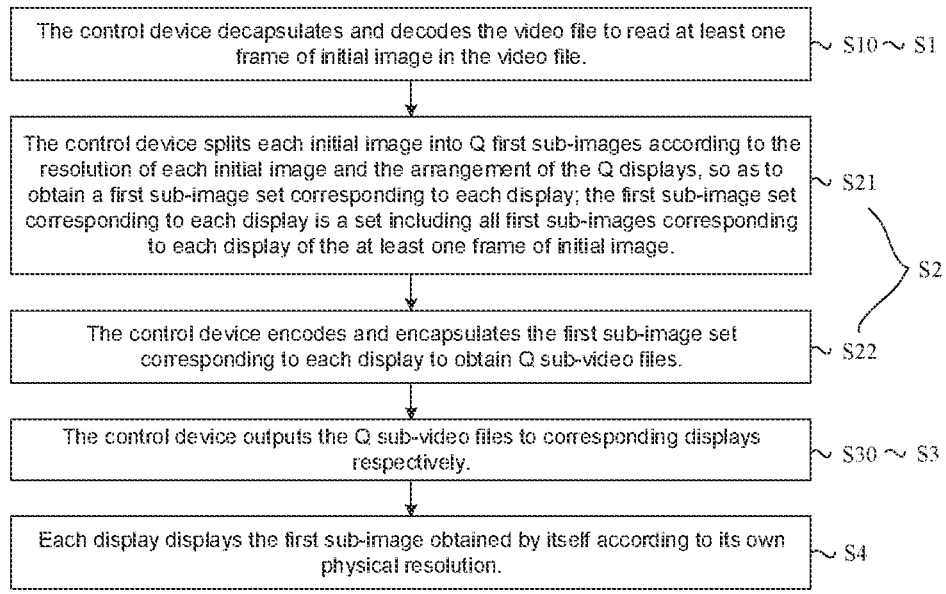
FIG. 5 is a flow diagram of yet another image processing method of a stitching display system, in accordance with some embodiments of the present disclosure.

In some embodiments of the present disclosure, referring to FIG. 5, that the control device splits each initial image into Q first sub-images according to a resolution of each initial image and the arrangement of the Q displays in S2 includes steps 21 and 22 (S21 and S22).

In S21, the control device splits each initial image into Q first sub-images according to the resolution of each initial image and the arrangement of the Q displays, so as to obtain a first sub-image set corresponding to each display. The first sub-image set corresponding to each display is a set including all first sub-images corresponding to each display of the at least one frame of initial image.

In S22, the control device encodes and encapsulates the first sub-image set corresponding to each display to obtain Q sub-video files.

For example, a plurality of first sub-images corresponding to a same display may form a sub-video file after being encoded and encapsulated. A format of the sub-video file is, for example, any of mp4, mov, and wmv.

For example, the plurality of first sub-images corresponding to the same display may be processed to form a sub-video file, and one sub-video file corresponds to one display.

For example, before S21, the control device may store the Q first sub-images obtained by splitting of each initial image.

In some possible examples, when the control device is displaying a video, each frame of a plurality of frames included in the video file needs to be split as an initial image, and all the first sub-images obtained after the splitting are stored by the control device. The plurality of first sub-images corresponding to the same display may be stored together in a certain sequence, and the storage sequence is the same as or corresponds to a sequence of the plurality of frames in the video file.

In some possible examples, the control device stores the Q first sub-images obtained by splitting each initial image in the first memory in sequence, and the Q first sub-images obtained through the splitting of one initial image are stored according to an one-to-one correspondence with the Q displays, and the plurality of first sub-images corresponding to the same display may be stored in a sequence of splitting of the plurality of initial images.

In combination with S21, a process of outputting the Q first sub-images obtained through the splitting of each initial image to the Q displays respectively in S3 may include the following content.

In step 30 (S30), the control device outputs the Q sub-video files to corresponding displays respectively.

For example, each sub-video file includes one or more first sub-images. After each display receives the sub-video file, the first sub-images included in the sub-video file may be extracted after the sub-video file is processed.

For example, when the control device splits the initial image, in a process of splitting the plurality of initial images included in the video file, the plurality of first sub-images corresponding to the same display may be stored together, and then, these first sub-images are encoded and encapsulated to obtain the sub-video file. In other words, the above process may be understood that the control device splits one video file into a plurality of sub-video files, and one sub-video file corresponds to one display. In this way, the control device can send data to the displays in the form of a sub-video file, so that the entire data transmission process is relatively simple, and performance requirements for a hardware (for example, the first processor) of the control device are low.

Figure 6A:
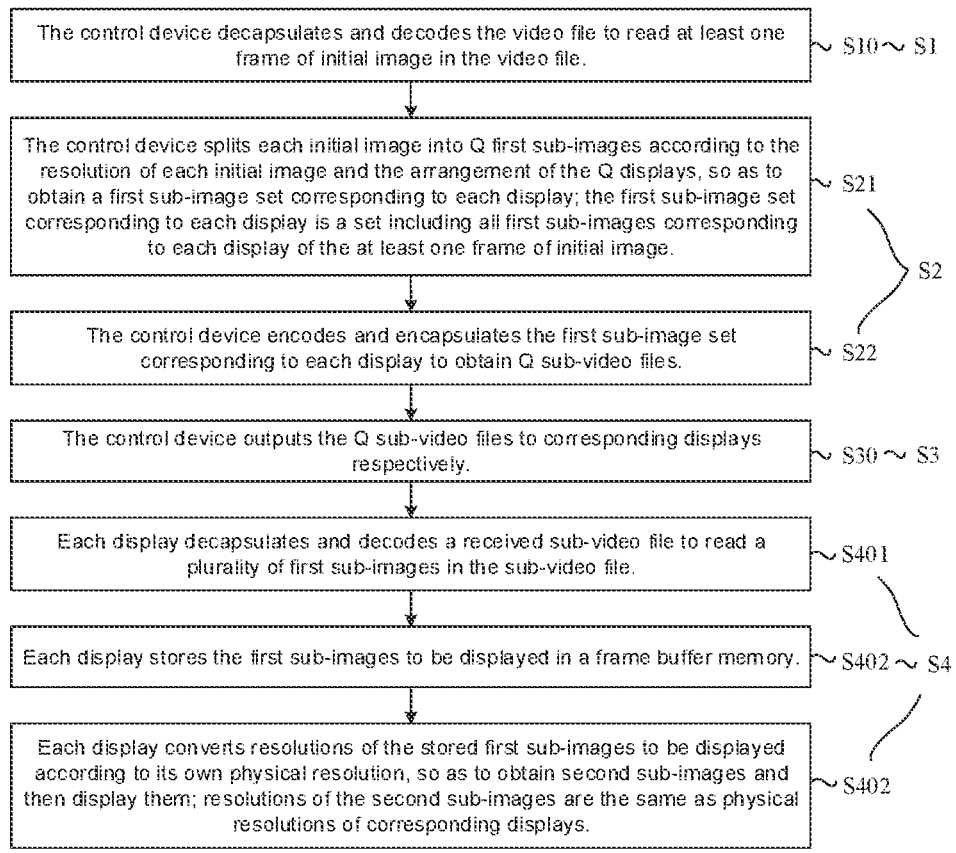
FIG. 6A is a flow diagram of yet another image processing method of a stitching display system, in accordance with some embodiments of the present disclosure.

In some embodiments of the present disclosure, referring to FIG. 6A, that each display displays the first sub-image obtained by itself according to its own physical resolution in S4 includes steps 401-403.

In S401, each display decapsulates and decodes a received sub-video file to read a plurality of first sub-images in the sub-video file.

For example, since the encapsulation format of the sub-video file is usually mp4, mov, wmv, etc., before the plurality of first sub-images stored in the sub-video file are read, the sub-video file needs to be decapsulated and decoded. Decapsulation and decoding are inverse processes of encapsulation and encoding.

It will be noted that a plurality of first sub-images are transmitted to the corresponding display in the form of a sub-video file, which may reduce a probability that the first sub-images are sent to a display that does not correspond to the first sub-images, and improve an image display efficiency.

In S402, each display stores the first sub-images to be displayed in a frame buffer memory, so that each display is able to convert resolutions of the stored first sub-images to be displayed according to its own physical resolution.

In some possible examples, the frame buffer memory may be located anywhere in the second memory.

In some possible examples, all the first sub-images share a same frame buffer memory in the second memory.

In S403, each display converts resolutions of the stored first sub-images to be displayed according to its own physical resolution, so as to obtain second sub-images and then display them. Resolutions of the second sub-images are the same as physical resolutions of corresponding displays.

The second processor may refresh an image displayed on each display by accessing the frame buffer memory. The second processor first reads the first sub-images to be displayed from the frame buffer memory, and then converts the resolutions of the first sub-images to obtain second sub-images.

Figure 6B:
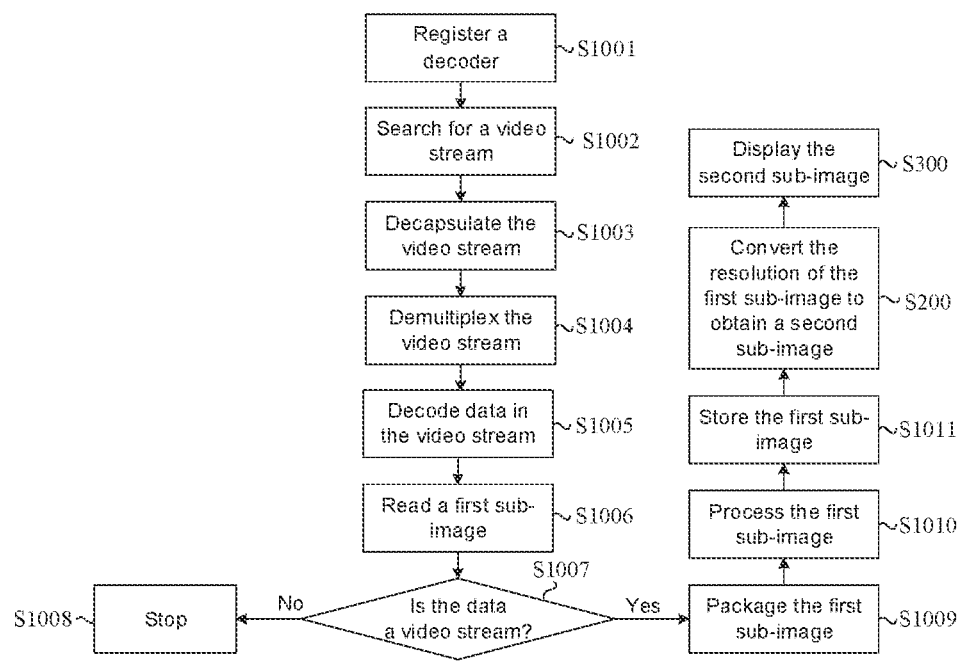
FIG. 6B is a flow diagram of a display process of a video stream, in accordance with the embodiments of the present disclosure.

For example, referring to FIG. 6B, in the stitching display system 1, after each display receives a sub-video file, the process of each display displaying the sub-video file includes, for example, the following steps 100-300 (S100~S300).

Step 100 includes steps 1001-1011 (S1001~S1011).

In step 1001 (S1001), a decoder is registered.

A type of the decoder is related to the format of the sub-video file. For example, the decoders corresponding to the mp4 and mov formats are different.

In step 1002 (S1002), a video stream is searched.

The video stream is searched in the sub-video file. The sub-video file includes, for example, a video stream and an audio file.

In step 1003 (S1003), the video stream is decapsulated.

The video stream is decapsulated to obtain the video stream in the sub-video file.

In step 1004 (S1004), the video stream is demultiplexed.

Data in the video stream is demultiplexed.

In step 1005 (S1005), data in the video stream is decoded by the decoder.

The data format in the video stream is, for example, any of YUV (a color coding method) or RGB (RGB color mode) format.

In step 1006 (S1006), a first sub-image is read.

The decoder is used to decode the data in the video stream, and read the data of a first sub-image from the decoded video stream.

In step 1007 (S1007), whether the read data is a video stream is determined.

Whether the read data of the first sub-image is a video stream is determined, if not, step 1008 (S1008) is performed, and if yes, step 1009 (S1009) is performed.

In S1008, if the read data is not the video stream, the process is stopped.

Since the read data is not the data of the first sub-image, subsequent display cannot be performed, and the process is just stopped.

In S1009, if the read data is the video stream, the first sub-image is packaged.

If the read data is the video stream, it means that the data is read correctly, so that the data of the first sub-image is stored in the memory in a form of a data packet.

In step 1010 (S1010), the first sub-image is processed.

The data packet is processed continuously, for example, copying, base on the data packet of the first sub-image.

In step 1011 (S1011), the first sub-image is stored.

For example, each display stores the processed first sub-image in the frame buffer memory.

In the foregoing process of displaying the sub-video file, S1003 to S1010 in FIG. 6B may be understood as a further explanation of S401 in FIG. 6A, and S1011 in FIG. 6B may be understood as a further explanation of S402 in FIG. 6A. In later part of the description, S200~S300 in FIG. 6B may be understood as a further explanation of S403 in FIG. 6A.

In step 200 (S200), when the resolution of the first sub-image is different from the physical resolution of the corresponding display, the resolution of the first sub-image is converted to obtain a second sub-image.

For example, the display reads data from the frame buffer memory, and then converts the resolution of the first sub-image according to the physical resolution of the display, so as to obtain the second sub-image, and the resolution of the second sub-image is equal to the physical resolution of the display.

In step 300 (S300), the second sub-image is displayed.

In the stitched display system 1 in some embodiments of the present disclosure, by adding the step of converting the resolution of the first sub-image, a display still can perform a normal display after receiving a first sub-image with a resolution different from its physical resolution.

It will be noted that in some embodiments of the present disclosure, by converting a resolution of a first sub-image, the resolution of the converted first sub-image is equal to a physical resolution of a corresponding display. The converted first sub-image may be referred to as the second sub-image.

In some embodiments of the present disclosure, a process that a display performs a resolution conversion on an obtained first sub-image according to its own physical resolution, i.e., S41, may include:

1) converting, by the display, the resolution of all regions of the obtained first sub-image according to the physical resolution of the display, so as to obtain a second sub-image. In this case, the display directly converting all regions of the first sub-image, and the conversion process being relatively simple;

or, 2) converting, by the display, the resolution of an effective region of the obtained first sub-image according to the physical resolution of the display.

For example, the display may extract a partial image in the effective region of the first sub-image, and then convert the resolution of the partial image in the effective region based on its own physical resolution, so as to obtain a second sub-image. This process may be understood as: the display only performing the resolution conversion on the effective region of the first sub-image. That is, the display converts a part of the first sub-image.

For example, since a viewer is usually interested in a certain region in an image, only an effective region of the first sub-image may be converted.

In some possible examples, the effective region may be a region in which the viewer is interested in the first sub-image. Since different viewers may have different regions of interest in a same image, the effective region of the first sub-image may change and can be selected according to the viewer's interest. A region in which the viewer is interested may be set by a user, or may be selected by the display from the first sub-image based on the user's behavior.

In some possible examples, the effective region may be a fixed region in the first sub-image. For example, the effective region may be a central region in the first sub-image.

For example, the effective region of the first sub-image may be an entire region in the first sub-image, or may be a partial region in the first sub-image.

In some possible examples, in a case where an area of an image in the effective region is less than an area of the first sub-image, when the resolution conversion of the image in the effective region of the first sub-image is performed, a data volume processed by each display is relatively small, so a conversion speed that the display converts the resolution of the first sub-image is fast. In particular, in a case where the resolution of the first sub-image is greater than the physical resolution of the display, when the display displays the effective region in the first sub-image with a small resolution, a display effect is better than a display effect when the display displays an image with a resolution greater than the physical resolution of the display.

For example, when determining the effective region in the first sub-image, a machine learning algorithm may be used by the display. In some examples, a process of obtaining the effective region through the machine learning algorithm may include: extracting features in the first sub-image, and then performing preliminary detection and matching on the extracted features, so as to determine the effective region of the first sub-image.

In some embodiments of the present disclosure, a process that a display performs a resolution conversion on the obtained first sub-images according to its own physical resolution may include: performing, by the display, the resolution conversion on at least one of the obtained first sub-images through an extraction method or an interpolation method, according to its own physical resolution.

The process of converting the resolution of at least one of the obtained first sub-images by the display through the extraction method and the interpolation method is described as follows. The resolution of the first sub-image being M×N, and the physical resolution of the display being $M_O \times N_O$ are taken as an example.

In some embodiments of the present disclosure, the process that the display performs resolution conversion on an obtained first sub-image according to its own physical resolution may include steps 2001 to 2003 (S2001 to S2003).

In S2001, if M is greater than or equal to $M_O$ (M≥$M_O$) and N is greater than or equal to $N_O$ (N≥$N_O$), R1 and R2 are calculated, and R1 and R2 are rounded to obtain R1' and R2'.

R1 is equal to $$\frac{M}{M_O}\left(R1 = \frac{M}{M_O}\right),$$

and R2 is equal to $$\frac{N}{N_O}\left(R2 = \frac{N}{N_O}\right).$$

For example, R1 and R2 being rounded can either is rounded up or rounded down. And whether R1 and R2 being rounded up or down may be, for example, selected according to the Rule of Rounding. If R1 and R2 are both integers, then R1 is equal to R1' (R1=R1') and R2 is equal to R2' (R2=R2').

In S2002, based on R1' and R2', the pixels in the first sub-image are divided to obtain $M_O \times N_O$ pixel groups.

In S2003, $M_O \times N_O$ pieces of second pixel data are obtained according to $M_O \times N_O$ pixel groups of first pixel data, so as to obtain a converted first sub-image, i.e., a second sub-image.

One pixel group corresponds to one piece of second pixel data;

At least one of the pixel groups includes R1'×R2' adjacent pixels.

In some embodiments of the present disclosure, a "pixel" may be considered as a pixel including a group of sub-pixels of three primary colors.

For example, $M_O \times N_O$ pixel groups have M'×N' pixels, and M' is a product of $M_O$ and R1' (M'=$M_O$×R1') and N' is a product of $N_O$ and R2' (N'=$N_O$×R2'). In a case where R1' is equal to R1 (R1'=R1), and R2' is equal to R2 (R2'=R2), M'×N' pixels are all the pixels included in the first sub-image; and in a case where R1' is not equal to R1 (R1'≠R1) and/or R2' is not equal to R2 (R2'≠R2), M'×N' pixels are the pixels in the first sub-image after being processed.

For example, each pixel in the first sub-image may be referred to as a first pixel, pixel data corresponding to each first pixel is first pixel data; each pixel in the second sub-image is referred to as a second pixel, and pixel data corresponding to each second pixel is second pixel data. The above-mentioned first pixel data and second pixel data include, for example, color information displayed by the pixels.

For example, the first pixel data of a pixel group includes the first pixel data of each first pixel in the pixel group.

In some embodiments of the present disclosure, in S2002, the process that the display divides the pixels in the first sub-image based on R1' and R2' to obtain $M_O \times N_O$ pixel groups includes steps 2002a and 2002b (S2002a and S2002b) as below.

In S2002a, in a case where R1' is equal to R1 (R1'=R1), and R2' is equal to R2 (R2'=R2), all the pixels in the first sub-image are divided into $M_O \times N_O$ pixel groups.

In S2002b, in a case where R1' is not equal to R1 (R1'≠R1) and/or R2' is not equal to R2 (R2'≠R2), image processing is performed on the first sub-image according to a predetermined processing mode, and all the pixels in the first sub-image after the image processing are divided into $M_O \times N_O$ pixel groups.

The foregoing predetermined processing mode includes at least one of the following: adding virtual pixels in the first sub-image, or reducing pixels in the first sub-image.

For example, in a case where R1' is equal to R1 (R1'=R1), and R2' is equal to R2 (R2'=R2), M'×N' pixels are all the pixels included in the first sub-image, that is, all the first pixels in the first sub-image are included. In this case, the first sub-image may be directly split into $M_O \times N_O$ pixel groups without processing the first sub-image. A position of one pixel group in the first sub-image corresponds to a position of one second pixel in the second sub-image, and a piece of second pixel data may be obtained according to R1'×R2' pieces of first pixel data in a pixel group.

Figure 7A:
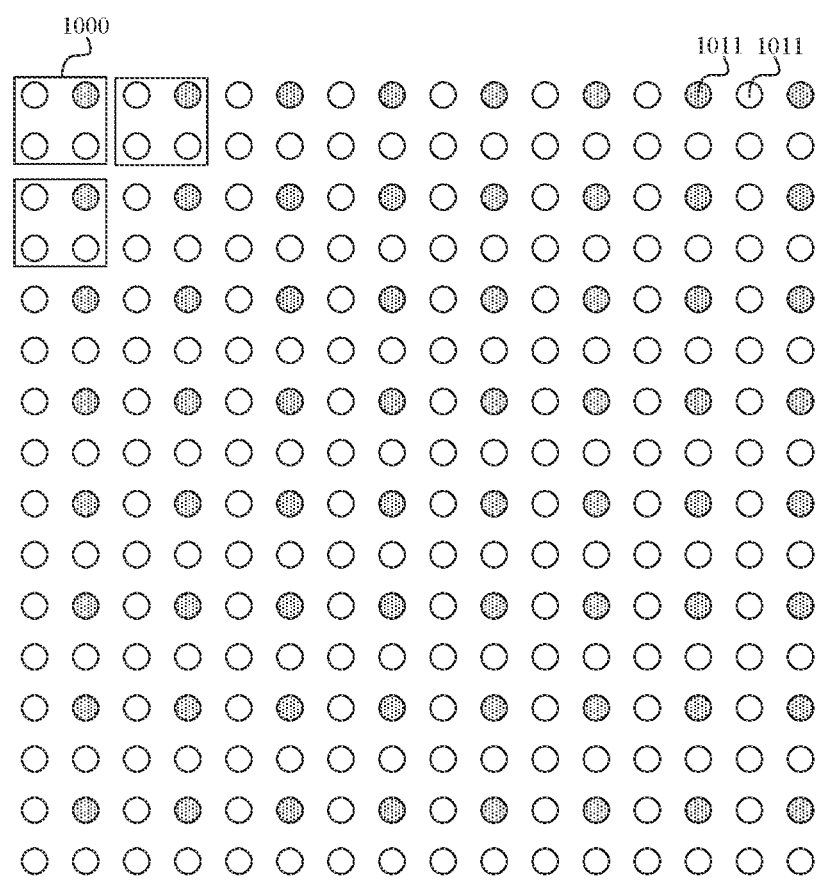
FIG. 7A is a diagram of a first sub-image, in accordance with some embodiments of the present disclosure.

In some possible examples, referring to FIG. 7A, a resolution of a first sub-image 101 is 16×16, and a physical resolution of a display is 8×8 (that is, $M_O$ is equal to 8 ($M_O$=8), and $N_O$ is equal to 8 ($N_O$=8)), then R1=16/8=2, R2=16/8=2, and R1 and R2 are both integers. In this case, 2×2 first pixels 1011 constitute a pixel group 1000, so that the first sub-image 101 includes a total of 8×8 pixel groups 1000, and one first pixel 1011 is located in only one pixel group 1000. Since R1 and R2 are both integers, M'=8×2=16, N'=8×2=16.

For example, in a case where R1' is not equal to R1 (R1'≠R1) and/or R2' is not equal to R2 (R2' $ R2), the first sub-image needs to be processed. For example, some virtual pixels 103 are added as the first pixels 1011 or some first pixels 1011 are reduced, so that the first sub-image may be divided into $M_0 \times N_0$ pixel groups 1000, and each pixel group includes R1'×R2' first pixels. A position of one pixel group 1000 in the first sub-image corresponds to a position of one second pixel in the second sub-image (i.e., the converted first sub-image), and one piece of second pixel data may be obtained according to the R1'×R2' pieces of first pixel data in one pixel group 1000.

Figure 7B:
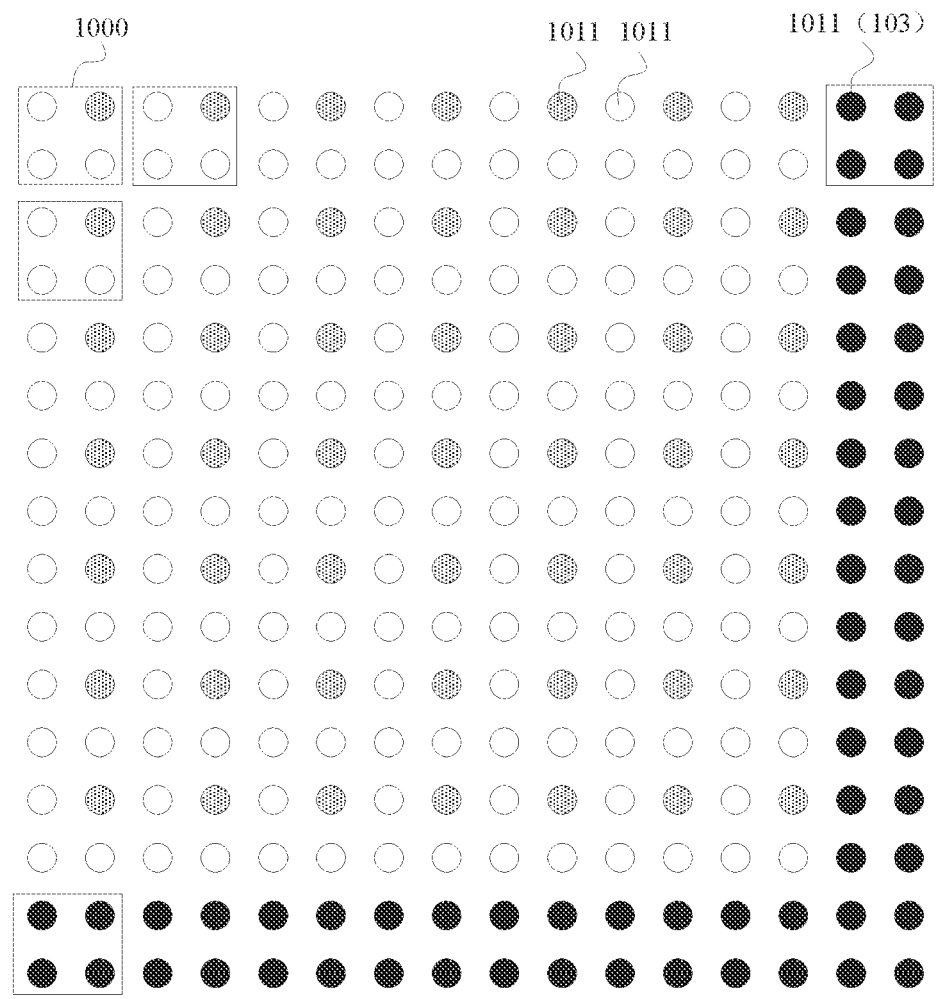
FIG. 7B is a diagram of another first sub-image, in accordance some the embodiments of the present disclosure.

In some possible examples, referring to FIG. 7B, a resolution of a first sub-image 101 is 14×14, and a physical resolution of a display is 8×8 (that is, $M_0$ is equal to 8 ($M_0$=8), and $N_0$ is equal to 8 ($N_0$=8)); and R1 is equal to 1.75 (R1=14/8=1.75), R2 is equal to 1.75 (R2=14/8=1.75); after being rounded up, R1' is equal to 2 (R1'=2), and R2' is equal to 2 (R2'=2). Because it is the rounding up, some virtual pixels 103 need to be added to the first sub-image as the first pixels 1011, so that the first sub-image may be divided into 8×8 pixel groups 1000. For example, in the first sub-image, in a row direction of the first pixels 1011, two virtual pixels 103 are added after the first pixels 1011 in each row, so that a number of the first pixels 1011 in each row increases to 16; and in a column direction of the first pixels 1011, two virtual pixels 103 are added after the first pixel 1011 in each column, so that the number of the first pixels 1011 in each column increases to 16. After the virtual pixels 103 are added, in the first sub-image, M'=8×2=16, and N'=8×2=16. In this case, 2×2 first pixels 1011 constitute one pixel group 1000. The first sub-image includes a total of 8×8 pixel groups 1000, and one first pixel 1011 is located in only one pixel group 1000.

It will be understood that a color of a virtual pixel 103 may be a specific color (for example, black), or may be the same as a color of a first pixel 1011 which is most proximate to the virtual pixel 103. In FIG. 7B, an example in which the color of the virtual pixels 103 is black is used for an illustration.

Figure 7C:
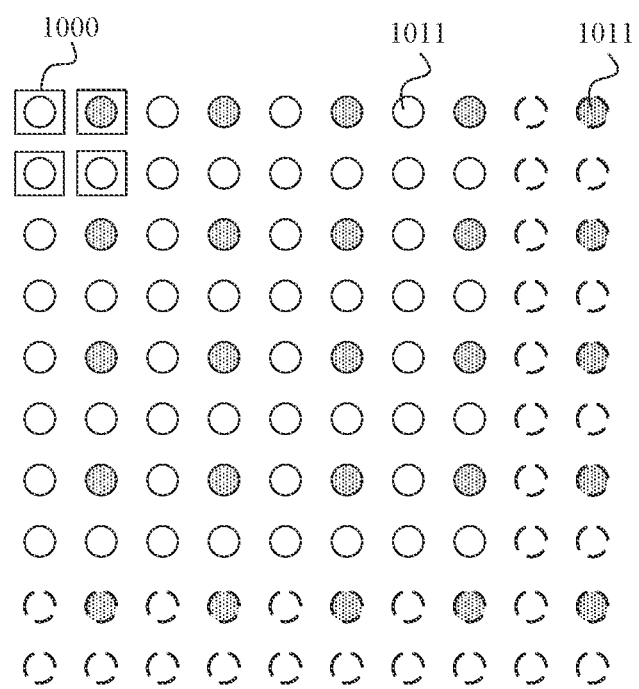
FIG. 7C is a diagram of yet another first sub-image, in accordance with some embodiments of the present disclosure.

In some possible examples, referring to FIG. 7C, a resolution of a first sub-image 101 is 10×10, and a physical resolution of a display is 8×8 (that is, $M_0$ is equal to 8 ($M_0$=8), and $N_0$ is equal to 8 ($N_0$=8)); then R1 is equal to 1.25 (R1=10/8=1.25), R2 is equal to 1.25 (R2=10/8=1.25); and after being rounded down, R1' is equal to 1 (R1'=1), and R2' is equal to 1 (R2'=1). Because it is the rounding down, the last two first pixels 1011 (the first pixels 1011 whose outer boundaries are dashed lines) in each row and in each column of the first sub-image will be discarded and will not be divided into the pixel groups 1000. In this case, in the first sub-image, M'=8×1=8, N'=8×1=8, 1×1 first pixel 1011 constitutes a pixel group 1000, so that the first sub-image includes a total of 8×8 pixel groups 1000, and one first pixel 1011 is located in only one pixel group 1000.

When a resolution of a first sub-image is greater than a physical resolution of a display, some virtual pixels 103 are added as first pixels 1011 or some first pixels 1011 are discarded, so that the first sub-image may be divided into a plurality of pixel groups 1000, and a number and an arrangement of the plurality of pixel groups 1000 are the same as the physical resolutions of the displays.

In some embodiments of the present disclosure, in S2003, a process of obtaining $M_0 \times N_0$ pieces of second pixel data according to the $M_0 \times N_0$ pixel groups of first pixel data may include at least one of step 2003a (S2003a) or step 2003b (S2003b).

In S2003a, first pixel data of one first pixel is selected from a pixel group 1000 as second pixel data corresponding to the pixel group 1000.

Figure 8A:
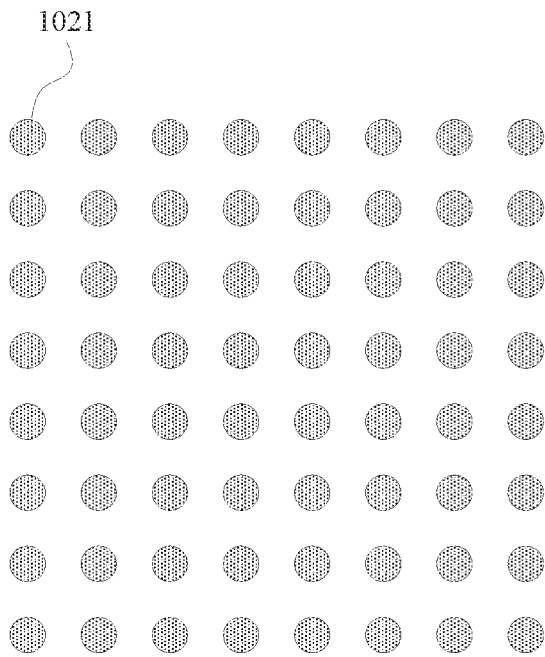
FIG. 8A is a diagram of a second sub-image, in accordance with some embodiments of the present disclosure.

In an example, referring to FIG. 7A, each pixel group 1000 includes four pieces of first pixel data. For example, the first pixel data of one pixel in a first row and second column in each pixel group 1000 is used as the second pixel data corresponding to the pixel group 1000, so that the second sub-image 102 as shown in FIG. 8A, for example, is obtained.

In S2003b, a weighted average of the pieces of first pixel data of all the first pixels in a pixel group 1000 is used as the second pixel data corresponding to the pixel group 1000.

Figure 8B:
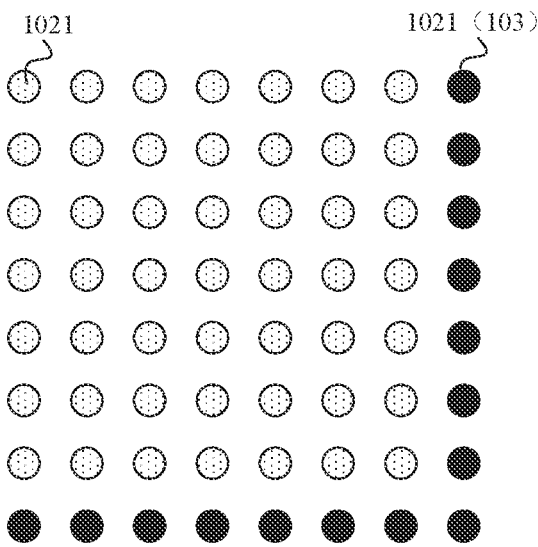
FIG. 8B is a diagram of another second sub-image, in accordance with some embodiments of the present disclosure.

In an example, referring to FIG. 7B, each pixel group 1000 includes four pieces of first pixel data, and a weighted average of the four pieces of first pixel data in each pixel group is calculated to obtain the second pixel data corresponding to each pixel group 1000, so that the second sub-image 102 as shown in FIG. 8B, for example, is obtained.

In this way, in a case where a resolution of a first sub-image is greater than a physical resolution of a display, R1'×R2' first pixels in the first sub-image constitute one pixel group 1000, and one piece of second pixel data is obtained through a plurality of pieces of first pixel data in the one pixel group 1000, thereby obtaining a second sub-image, which simplifies a resolution conversion mode and improves the image processing efficiency.

In some embodiments of the present disclosure, the process that the display performs the resolution conversion on an obtained first sub-image according to its own physical resolution may include step 3001 (S3001).

In S3001, if M is less than $M_0$ (M<$M_0$) and N is less than $N_0$ (N<$N_0$), M rows of first pixels in the first sub-image are expanded to $M_0$ rows of second pixels, and N columns of first pixels in the first sub-image are expanded to $N_0$ columns of second pixels.

For example, since M is less than $M_0$ (M<$M_0$) and N is less than $N_0$ (N<$N_0$), some pixels may be added. These newly-added pixels are hereinafter referred to as newly-added pixels, so that in the row direction, a sum of the first pixels and the newly-added pixels is equal to $N_0$; and in the column direction, the sum of the first pixels and the newly-added pixels is equal to $M_0$.

Figure 9A:
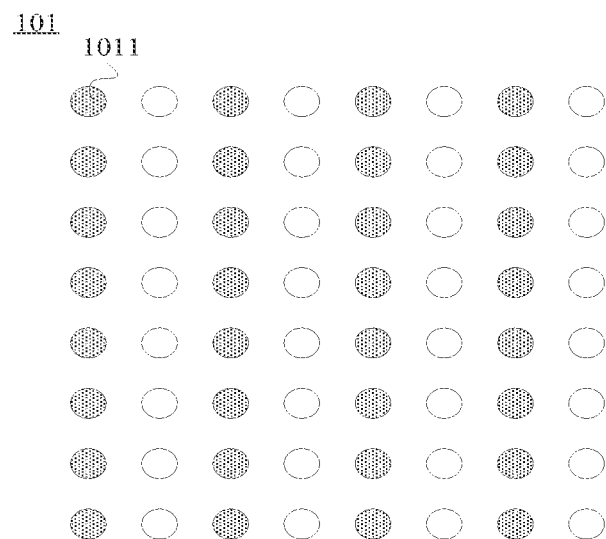
FIG. 9A is a diagram of a first sub-image, in accordance with some embodiments of the present disclosure.

In an example, referring to FIG. 9A, a physical resolution of a display is, for example, 16×16, and a resolution of a first sub-image is, for example, 8××8. Then, both a number of first pixels in each column and in each row need to be increased to 16, so that 8 rows of first pixels are expanded to 16 rows of second pixels, and 8 columns of first pixels are expanded to 16 columns of second pixels.

Figure 9B:
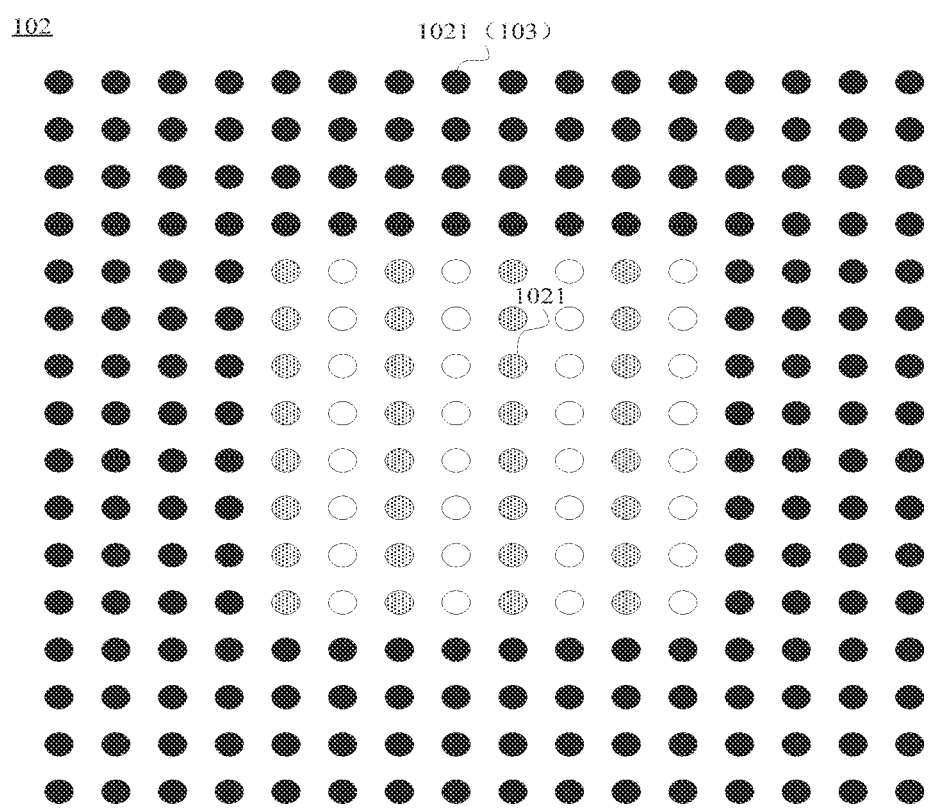
FIG. 9B is a diagram of a second sub-image, in accordance with some embodiments of the present disclosure.

For example, four virtual pixels 103 are added respectively before a first pixel at beginning in each row and after a first pixel at last in each row, and four virtual pixels 103 are added respectively before a first pixel at beginning in each column and after a first pixel at last in each column. Virtual pixel data of a virtual pixel 103 is the same as first pixel data of a first pixel which is most proximate to the virtual pixel or is 0. When the virtual pixel data is 0, a color displayed by the virtual pixel 103 is, for example, black, so that a second sub-image 102 as shown in FIG. 9B may be obtained. A resolution of the second sub-image 102 is 16×16, and these virtual pixels 103 form black edges in the second sub-image 102. This manner of converting the resolution of the first sub-image 101 to obtain the second sub-image 102 is relatively simple.

In some embodiments of the present disclosure, in S3001, the process that the display expands the M rows of first pixels in the first sub-image to $M_0$ rows of second pixels may include:

1) calculating D1, and rounding D1 to obtain D1', and D1 being equal to $$\frac{M_0}{M}\left(D1 = \frac{M_0}{M}\right);$$

2) in a case where D1 is equal to D1' (D1=D1'), inserting (D1'−1) newly-added pixels before or after each first pixel in each column, and the $M_0$ rows of second pixels including M rows of first pixels and ($M_0$−M) rows of newly-added pixels;

in a case where D1 is not equal to D1' (D1≠D1') and D1 is rounded up to obtain D1', inserting (D1'−1) newly-added pixels before or after each of A1 first pixels in each column; A1=($M_0$−M)/(D1'−1), and the $M_0$ rows of second pixels including M rows of first pixels and ($M_0$−M) rows of newly-added pixels; and in a case where D1 is not equal to D1' (D1≠D1') and D1 is rounded down to obtain D1', inserting ($M_0$−M×D1') virtual pixels before a first pixel at beginning in each column or after a first pixel at last in each column, pixel data of the virtual pixels being the same as pixel data of a first pixel which is most proximate to the virtual pixels or being 0; and inserting (D1'−1) newly-added pixels before or after each first pixel in each column; and the $M_0$ rows of second pixels including M rows of first pixels, ($M_0$−M×D1') rows of virtual pixels, and (M×D1'−M) rows of newly-added pixels.

In some embodiments of the present disclosure, in S3001, the process that the display expands the N columns of first pixels in the first sub-image to $N_0$ columns of second pixels may include:

1) calculating D2, and rounding D2 to obtain D2', and D2 being equal to $$\frac{N_0}{N}\left(D2 = \frac{N_0}{N}\right);$$

2) in a case where D2 is equal to D2' (D2=D2'), inserting (D2' 1) newly-added pixels before or after each first pixel in each row, and the $N_0$ columns of second pixels including N columns of first pixels and ($N_0$−N) newly-added pixels;

in a case where D2 is not equal to D2' (D2≠D2') and D2 is rounded up to obtain D2', inserting (D2'−1) newly-added pixels before or after each of A2 first pixels in each row; A2=($N_0$−N)/(D2'−1), and the $N_0$ columns of second pixels including N columns of first pixels and ($N_0$−N) columns newly-added pixels; and in a case where D2 is not equal to D2' (D2≠D2') and D2 is rounded down to obtain D2', inserting ($N_0$−N×D2') virtual pixels before a first pixel at beginning in each column or after a first pixel at last in each row, pixel data of the virtual pixels being the same as pixel data of a first pixel which is most proximate to the virtual pixels or being 0; and inserting (D2'−1) newly-added pixels before or after each first pixel in each row; and the $N_0$ columns of second pixels including N columns of first pixels, ($N_0$−N×D2') columns of virtual pixels, and (N×D2'−N) columns of newly-added pixels.

For example, any of the above newly-added pixels is obtained based on any of the following: 1) pixel data of a first pixel corresponding to the any of the newly-added pixels, or 2) a weighted average of pixel data of two adjacent first pixels corresponding to the any of the newly-added pixels.

In some possible examples, the newly-added pixel(s) are usually located between two adjacent first pixels.

In some possible examples, when a pixel is added, it may be considered that pixel data corresponding to the pixel is added.

A process of pixel expansion in S3001 will be described in detail on an aspect of pixel data.

In scenario 1, in a case where D1 is equal to D1' (D1=D1'), (D'−1) pieces of newly-added pixel data are inserted before or after each piece of first pixel data in each column. For example, each piece of first pixel data is used as a piece of newly-added pixel data, and/or a weighted average of two pieces of adjacent first pixel data is used as a piece of newly-added pixel data located between the two pieces of adjacent first pixel data. At last, a piece of first pixel data corresponds to a piece of second pixel data, and a piece of newly-added pixel data corresponds to a piece of second pixel data, so as to obtain $M_0$ rows of pieces of second pixel data.

In scenario 2, in a case where D2 is equal to D2' (D2=D2'), (D2'−1) pieces of newly-added pixel data are inserted before or after each piece of first pixel data in each row. For example, each piece of first pixel data is used as a piece of newly added pixel data, and/or a weighted average of two pieces of adjacent first pixel data is used as a piece of newly-added pixel data located between the two pieces of adjacent first pixel data. At last, a piece of first pixel data corresponds to a piece of second pixel data, and a piece of newly-added pixel data corresponds to a piece of second pixel data, so as to obtain $N_0$ columns of pieces of second pixel data.

In some possible examples, that each piece of first pixel data is used as a piece of newly added pixel data may be understood that: in the column direction, if at least one piece of newly-added pixel data is inserted before each piece of first pixel data, the newly-added pixel data is added based on a piece of first pixel data located thereafter and adjacent thereto: if at least one piece of newly-added pixel data is inserted after each piece of first pixel data, the newly-added pixel data is added based on a piece of first pixel data located in front of it and adjacent to it; and if a plurality of pieces of newly-added pixel data are inserted before or after each piece of first pixel data, the plurality of pieces of newly-added pixel data may be, for example, the same.

In some possible examples, that a weighted average of two pieces of adjacent first pixel data is used as a piece of newly-added pixel data located between the two pieces of adjacent first pixel data may be understood that: whether a piece of newly-added pixel data is inserted before or after each piece of first pixel data, there will be a newly-added pixel data between two pieces of adjacent first pixel data. The newly-added pixel data may be a weighted average of two pieces of first pixel data adjacent to the newly-added pixel data (for example, two pieces of first pixel data located on both sides of the newly-added pixel data and adjacent to the newly-added pixel data). In addition, when there are a plurality of pieces of newly-added pixel data between two pieces of adjacent first pixel data, the plurality of pieces of newly-added pixel data may be the same or different. For example, by adjusting weights of the two pieces of adjacent first pixel data, a plurality of different weighted averages of the two pieces of adjacent first pixel data are obtained, so as to obtain a plurality of pieces of different newly-added pixel data. As another example, when the weights of two pieces of adjacent first pixel data are adjusted, weight assignment may be based on a principle that the more proximate the newly-added pixel is to one first pixel of the two adjacent first pixels, the larger a weight of first pixel data of the one first pixel is.

For example, referring to FIG. 9A, assuming that a physical resolution of a display is 16×16, a resolution of a first sub-image 101 is 8×8, and then $$D1 = \frac{16}{8} = 2, \text{ and } D2 = \frac{16}{8} = 2.$$

Therefore, in the column direction, 2−1=1 piece of newly-added pixel data may be inserted after each piece of first pixel data, so that 8 rows of pieces of first pixel data may be expanded to 16 rows; and in the row direction, 2−1=1 piece of newly-added pixel data is inserted after each piece of first pixel data, so that 8 columns of pieces of first pixel data may be expanded to 16 columns. One piece of first pixel data corresponds to one piece of second pixel data, and one piece of newly-added pixel data corresponds to one piece of second pixel data.

Figure 9C:
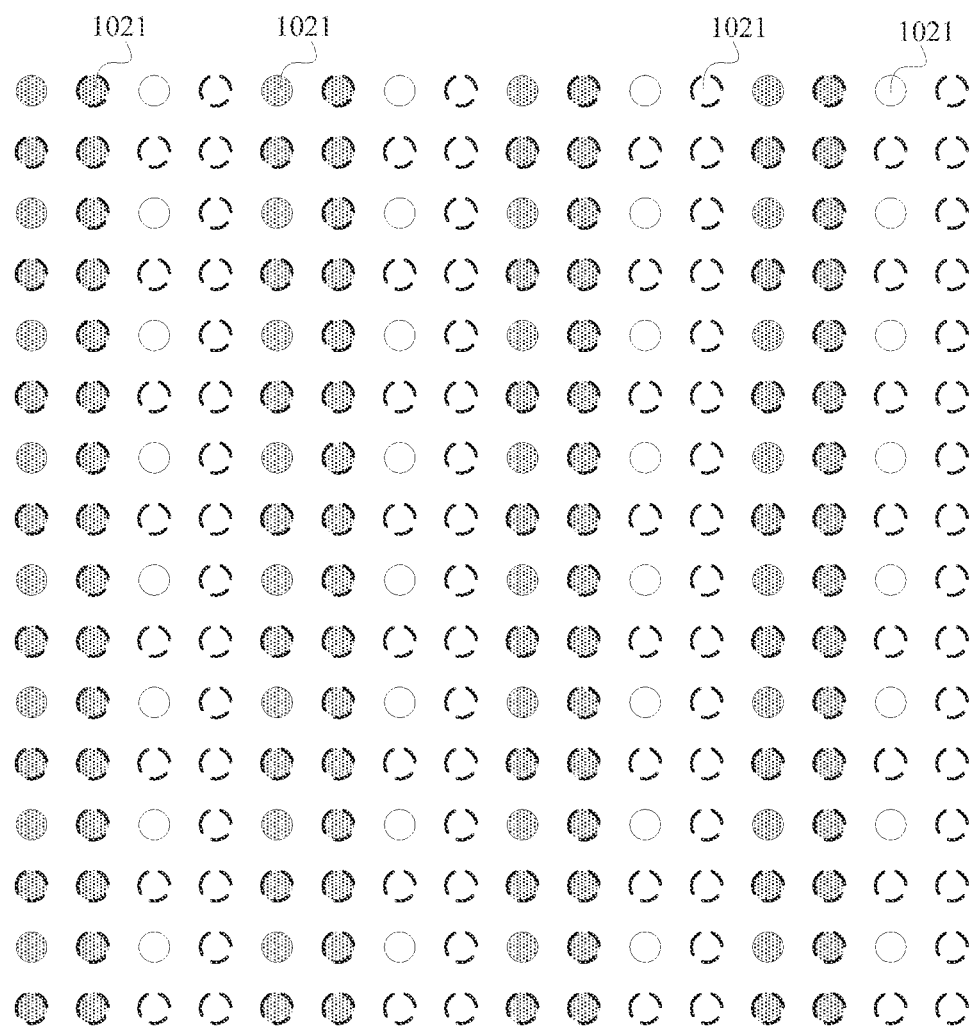
FIG. 9C is a diagram of another second sub-image, in accordance with some embodiments of the present disclosure.

In an example, the newly-added pixel data being the same as the previous first pixel data, so that a second sub-image 102 as shown in FIG. 9C is obtained. A resolution of the second sub-image 102 is 16×16, and the resolution of the second sub-image 102 is equal to the physical resolution of the display.

In another example, the newly-added pixel data may also be a weighted average of two pieces of adjacent first pixel data. Referring to FIG. 9C, the second pixel data in a first row and second column is the same as a piece of newly-added pixel data. The newly-added pixel data may be, for example, a weighted average of a first piece of pixel data and a second piece of pixel data in the first row in FIG. 9A. On this basis, a weight of the first piece of first pixel data is, for example, 0.6, and a weight of the second piece of first pixel data is, for example, 0.4. Alternatively, the weights of the first piece of first pixel data and the second piece of first pixel data are both 0.5; in this case, the newly-added pixel data may also be referred to as an average of the first piece of first pixel data and the second piece of first pixel data.

In scenario 3, in a case where D1 is not equal to D1' (D1≠D1') and D1 is rounded up to obtain D1', (D1'−1) pieces of newly-added pixel data are inserted before or after each of A1 pieces of first pixel data in each column, and A1=$(M_O-M)/(D1'-1)$. For example, each piece of first pixel data is used as a piece of newly added pixel data, and/or a weighted average of two pieces of adjacent first pixel data is used as the newly-added pixel data located between the two pieces of adjacent first pixel data. At last, a piece of first pixel data corresponds to a piece of second pixel data, and a piece of newly-added pixel data corresponds to a piece of second pixel data, so as to obtain $M_O$ rows of pieces of second pixel data.

In scenario 4, in a case where D2 is not equal to D2' (D2≠D2') and D2 is rounded up to obtain D2', (D2'−1) pieces of newly-added pixel data are inserted before or after each of A2 pieces of first pixel data in each row, and A2=$(N_O-N)/(D2'-1)$. For example, each piece of first pixel data is used as a piece of newly added pixel data, and/or a weighted average of two pieces of adjacent first pixel data is used as the newly-added pixel data located between the two pieces of adjacent first pixel data. At last, a piece of first pixel data corresponds to a piece of second pixel data, and a piece of newly-added pixel data corresponds to a piece of second pixel data, so as to obtain $N_O$ columns of pieces of second pixel data.

Figure 9D:
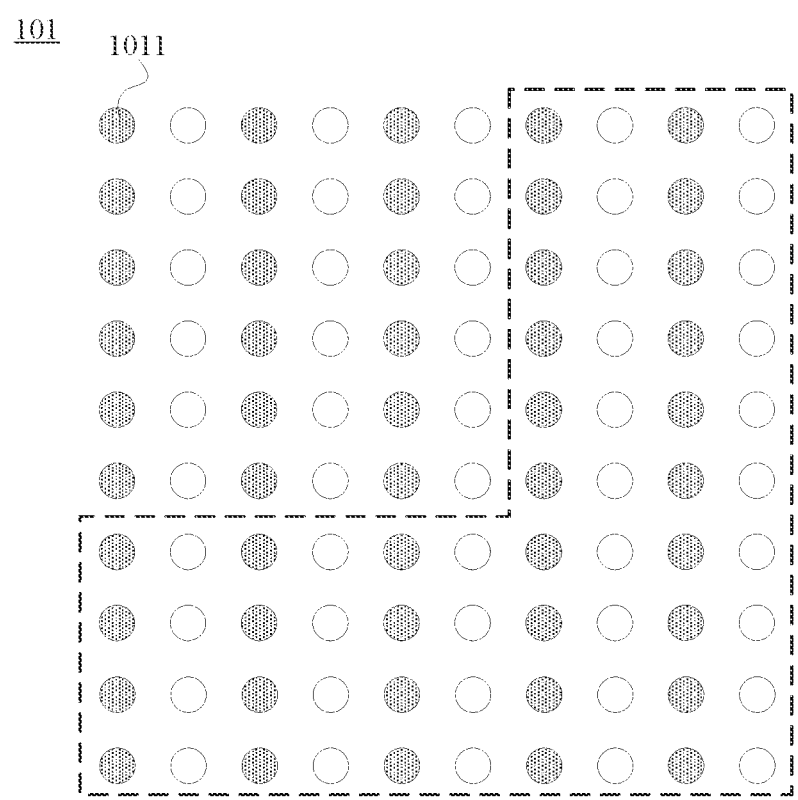
FIG. 9D is a diagram of another first sub-image, in accordance with some embodiments of the present disclosure.
Figure 9E:
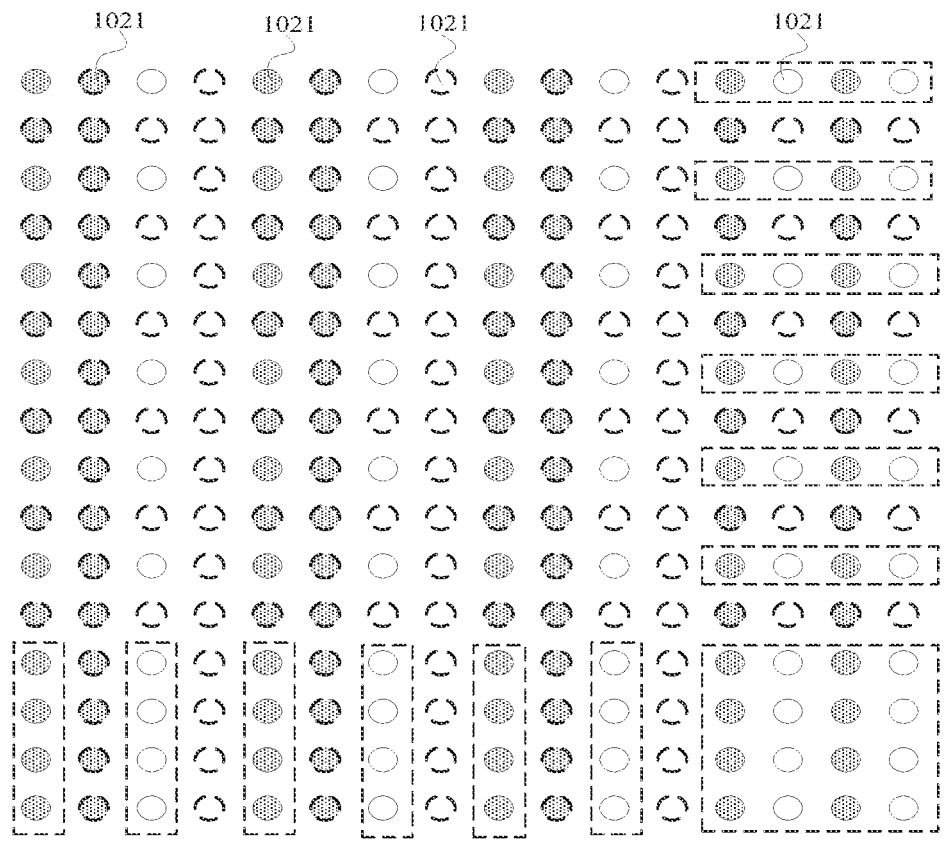
FIG. 9E is a diagram of yet another second sub-image, in accordance with some embodiments of the present disclosure.

For example, referring to FIG. 9D, assuming that a physical resolution of a display is, for example, 16×16, and a resolution of a first sub-image 101 is, for example, 10×10, it is calculated that D1 is equal to 1.6 (D1=1.6), and D2 is equal to 1.6 (D2=1.6), and after being rounded up, D1' is equal to 2 (D1'=2), and D2' is equal to 2 (D2'=2), which calculates that A1=(16−10)/(2−1)=6, and A2=(16−10)/(2−1)=6. Referring to FIG. 9D, in the row direction, one piece of newly-added pixel data is inserted after each of the first six pieces of first pixel data in each row; and in the column direction, one piece of newly-added pixel data is also inserted after each of the first six pieces of first pixel data in each column, thereby obtaining a second sub-image 102 as shown in FIG. 9E. A resolution of the second sub-image 102 is 16×16.

With reference to FIGS. 9D and 9E, the above process may be understood as inserting one piece of newly-added pixel data after each piece of first pixel data outside a dashed box in FIG. 9D respectively in the row direction and in the column direction, so as to obtain a second pixel data as shown in FIG. 9E. Referring to FIG. 9D, it is calculated that A3=M−A1 and A4=N−A2, that is, A3=10−6=4, A4=10−6=4, so that there is no need to insert the pieces of newly-added pixel data after the last four pieces of first pixel data in each row and after the last four pieces of first pixel data in each column (i.e., the pieces of first pixel data in the dashed box in FIG. 9D). Referring to FIG. 9E, all the pieces of second pixel data in the dashed box in FIG. 9E are in a one-to-one correspondence with the pieces of first pixel data in the dashed box in FIG. 9D.

In scenario 5, in a case where D1 is not equal to D1' (D1≠D1') and D1 is rounded down to obtain D1', $(M_O-M\times D1')$ pieces of virtual pixel data are inserted before a piece of first pixel data at beginning in each column or after a piece of first pixel data at last in each column, the pieces of virtual pixel data are the same as a piece of first pixel data which is most proximate to them or is 0; and (D1'−1) pieces of newly-added pixel data are inserted before or after each piece of first pixel data in each column, each piece of first pixel data is used as a piece of newly added pixel data, and/or a weighted average of two pieces of adjacent first pixel data is used as the newly-added pixel data located between the two pieces of adjacent first pixel data. At last, a piece of first pixel data corresponds to a piece of second pixel data, a piece of virtual pixel data corresponds to a piece of second pixel data, and a piece of newly-added pixel data corresponds to a piece of second pixel data, so as to obtain $M_O$ rows of pieces of second pixel data.

In scenario 6, in a case where D2 is not equal to D2' (D2≠D2') and D2 is rounded down to obtain D2', $(N_O-N\times D2')$ pieces of virtual pixel data are inserted before a piece of first pixel data at beginning in each row or after a piece of first pixel data at last in each row, the pieces of virtual pixel data are the same as a piece of first pixel data which is most proximate to them or is 0; and (D2'−1) pieces of newly-added pixel data are inserted before or after each piece of first pixel data in each row, each piece of first pixel data is used as a piece of newly added pixel data, and/or a weighted average of two pieces of adjacent first pixel data is used as the newly-added pixel data located between the two pieces of adjacent first pixel data. At last, a piece of first pixel data corresponds to a piece of second pixel data, a piece of virtual pixel data corresponds to a piece of second pixel data, and a piece of newly-added pixel data corresponds to a piece of second pixel data, so as to obtain $N_0$ columns of pieces of second pixel data.

Figure 9F:
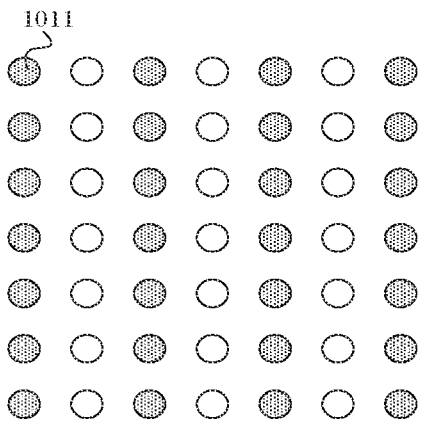
FIG. 9F is a diagram of yet another first sub-image, in accordance with some embodiments of the present disclosure.
Figure 9G:
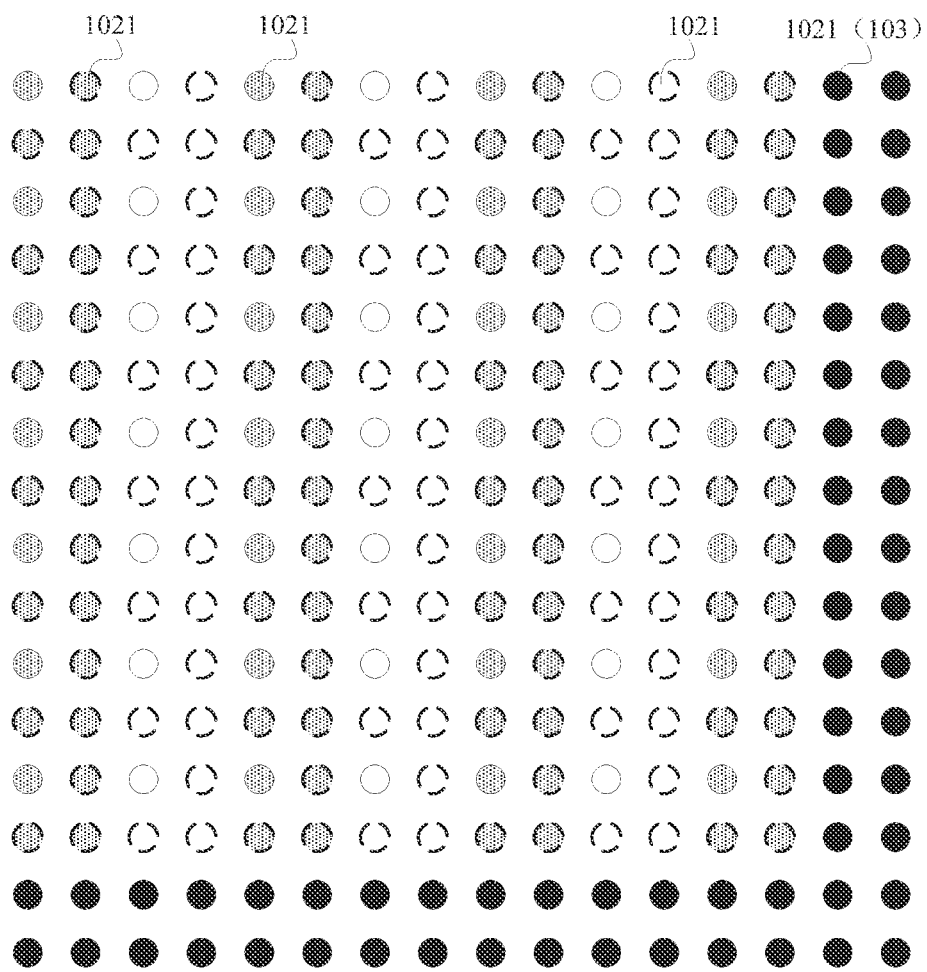
FIG. 9G is a diagram of yet another second sub-image, in accordance with some embodiments of the present disclosure.

For example, referring to FIG. 9F, it is assumed that a physical resolution of a display is, for example, 16×16, and a resolution of a first sub-image 101 is, for example, 7×7. Firstly, it is calculated that D1=16/7=2.29, D2=16/7=2.29; after being rounded down, D1'=2, D2'=2. Secondly, a number of virtual pixels 103 is calculated: in the row direction, $N_0-N\times D2'=16-7\times 2=2$; and in the column direction, $M_0-M\times D1'=16-7\times 2=2$. For example, two virtual pixels 103 are inserted after the first pixel data at last in each row and after the first pixel data at last in each column, and the virtual pixel data is, for example, 0. Thirdly, according to D1' and D2', for example, one piece of newly-added pixel data is inserted after each first pixel data 1011 in each row, and one piece of newly-added pixel data is inserted after each first pixel data 1011 in each column. At last, one piece of first pixel data corresponds to one piece of second pixel data, one piece of newly-added pixel data corresponds to one piece of second pixel data, and one virtual pixel data corresponds to one piece of second pixel data, thereby obtaining the second sub-image 102 as shown in FIG. 9G A resolution of the second sub-image 102 is equal to 16×16.

It will be noted that the above 6 scenarios (i.e., the above scenario 1 to scenario 6) may be used in combination according to actual application, that is, any one of the above D1=D1', D1≠D1' and rounding up, D1≠D1' and rounding down may be combined with any one of the above D2=D2', D2≠D2' and rounding up, D2≠D2' and rounding down. For example, in a case where D1 is equal to D1' (D1=D1') and D2 is not equal to D2' (D2≠D2') and D2' is rounded up, the first sub-image 101 is processed, and the processing is the same as that in the above-mentioned cases, so it will not be repeated.

Through the above method, a first sub-image with a resolution different from a physical resolution of a display may be converted into a second sub-image according to the physical resolution of the display in a relatively simple manner, so that the display finally displays the second sub-image. A display content of the second sub-image is substantially close to a display content of the first sub-image. Therefore, the display in the present disclosure has the function of converting the resolution of the first sub-image. Therefore, when the initial image is split, there is no need to take the physical resolution of the display into account, so that the splitting of the initial image is relatively simple.

Some embodiments of the present disclosure further provide a stitching display system 1, including: a control device 2 and Q displays 10, and Q is a positive integer greater than or equal to 2.

The control device 2 is configured to obtain at least one initial image; split each initial image into Q first sub-images according to a resolution of each initial image and an arrangement of the Q displays; and respectively output the Q first sub-images obtained by splitting each initial image to the Q displays 10.

Each display 10 is configured to display the first sub-image obtained by the each display according to its own physical resolution.

For the introduction of the control device 2, reference may be made to the previous description of the control device 2.

For the introduction of the display 10, reference may be made to the foregoing description of the display 10.

Figure 10:
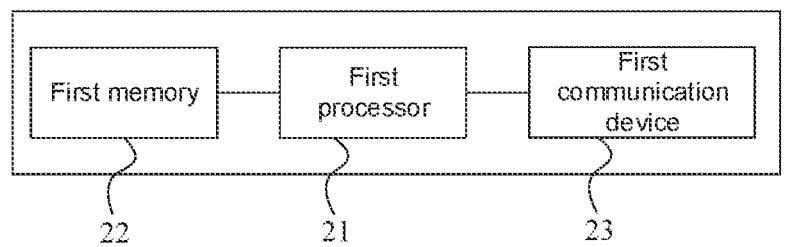
FIG. 10 is a structural diagram of a control device, in accordance with some embodiments of the present disclosure.

In some embodiments, referring to FIG. 10, the control device 2 includes, for example, a first processor 21, a first memory 22, and a first communication device 23.

The first processor 21 is configured to obtain at least one initial image.

For example, the first processor 21 is configured to obtain an initial image from a video file.

The first processor 21 is further configured to split each initial image into the Q first sub-images according to the resolution of each initial image and the arrangement of the Q displays.

For a process of splitting the initial image into the Q first sub-images, reference may be made to the process of splitting the initial image in the foregoing, which will not be repeated here.

The first memory 22 is configured to store each initial image, the Q first sub-images 101 obtained through the splitting of each initial image, or Q sub-video files obtained through the splitting of a video file.

After the first processor 21 obtains the Q first sub-images 101 by splitting each initial image, the Q first sub-images may be stored in the first memory 22; and if a plurality of initial images in the video file are split, Q sub-video files may be obtained. Each sub-video file includes a plurality of first sub-images, and one sub-video file corresponds to one display 10.

The Q first sub-images or the sub-video files may be stored first, and then the Q first sub-images or the Q sub-video files are output to the display 10, thereby the process of transmitting the Q first sub-images or the Q sub-video files to the display 10 is relatively simple.

In some embodiments, the first memory 22 is not necessary, first communication device 23 outputs the Q first sub-images or the Q sub-video files to the Q displays while the first processor 21 splitting an initial image or a video file, and the Q first sub-images or the Q sub-video files are stored by the Q displays.

The first communication device 23 is configured to output the Q first sub-images 101 obtained through the splitting of each initial image to the Q displays 10 respectively, or to output the Q sub-video files to the Q displays 10 respectively.

The first communication device 23 may perform data transmission with the Q displays 10, and transmits the Q first sub-images 101 to a corresponding display 10, so as to be displayed by the display 10. The first communication device 23 is, for example, a Lora communication module.

Figure 11:
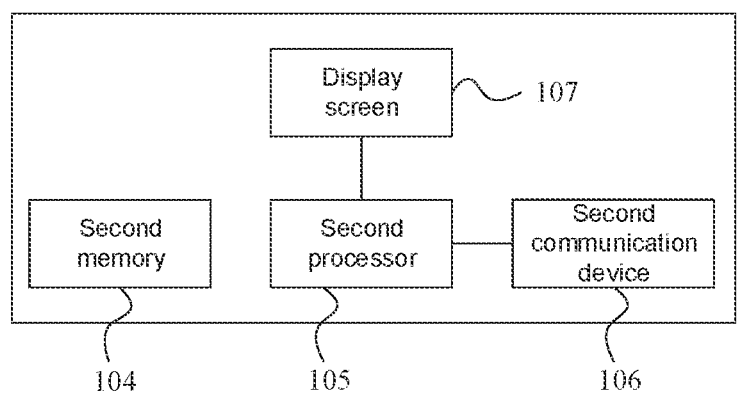
FIG. 11 is a structural diagram of a display, in accordance with some embodiments of the present disclosure.

In some other embodiments, referring to FIG. 11, each of the Q displays 10 includes: a second processor 104, a display screen 105, a second communication device 106, and a second memory 107.

The display screen 105 is configured to directly display an obtained first sub-image if a resolution of the first sub-image obtained by a display 10 is the same as a physical resolution of the display 10.

The second processor 104 is configured to perform resolution conversion on the obtained first sub-image according to the physical resolution of the display 10 if the resolution of the first sub-image 101 obtained by the display 10 is different from the physical resolution of the display 10, so as to obtain a second sub-image 102. The display screen 105 is further configured to display the sub-image 102; and a resolution of the second sub-image 102 is the same as the physical resolution of the display 10.

The process of performing resolution conversion on the obtained first sub-image by the second processor 104 may refer to the resolution conversion process in the above, and will not be repeated here.

The second memory 107 is configured to store the Q first sub-images 101 or the Q sub-video files constitute by a plurality of first sub-images 101, or Q second sub-images 102 obtained by performing resolution conversion on the Q first sub-images 101, or Q sub-video files constitute by a plurality of second sub-images 102.

The second communication device 106 is configured to communicate with the first communication device 23; and the second communication device 106 is, for example, a Lora communication module.

In some embodiments, it is assumed that a physical resolution of a display 10 is 32×32, a size of the display 10 is, for example, 1 m×1 m. A resolution of a first sub-image 101 is, for example, 640×480. Since the display 10 has a large size and a small number of pixels, a distance between two adjacent pixels is large, and the resolution of the first sub-image is much greater than the physical resolution of the display 10, the display 10 needs to have a function of converting the resolution of the first sub-image for normal display.

Some embodiments of the present disclosure further provides a non-stationary computer readable storage medium, and the non-stationary computer readable storage medium stores a computer program. When the computer program is executed, the image processing methods of the control device 2 as shown in FIG. 2, 4, 5, 6A or 6B are performed. Therefore, the non-stationary computer readable storage medium has same beneficial effects as the image processing method of the control device 2, so it will not be repeated.

It will be noted that, referring to FIGS. 7A~7C, FIGS. 8A~8B, FIGS. 9A~9G, the pixels in the first sub-image 101 are all first pixels 1011, and the pixels in the second sub-image 102 are all second pixels 1021. That is to say, when the virtual pixel 103 is located in the first sub-image 101, it represents a first pixel 1011, and the first pixel data of the first pixel 1011 is equal to the pixel data of the virtual pixel 103; and when the virtual pixel 103 is located in the second sub-image 102, it represents a second pixel 1021, and the second pixel data of the second pixel 1021 is equal to the pixel data of the virtual pixel 103. For example, referring to FIG. 9G, relationships among the second pixels 1021 and the first pixels 1011 (an outer boundary of a graphic is a solid line), the newly-added pixels (an outer boundary of a graphic is a dotted line) and the virtual pixels 103 (a filling color of a graphic is black) may be distinguished by the outer boundaries and the filling colors of the graphics.

It will be noted that the resolutions in some embodiments of the present disclosure being the same may be understood that a number of rows and a number of columns of pixels are the same.

It will be noted that the same reference numbers in some embodiments of the present disclosure can represent pixels or pixel data.

The forgoing descriptions are merely specific implementation manners of the present disclosure, but the protection scope of the present disclosure is not limited thereto. Any changes or replacements that a person skilled in the art could readily conceive of within the technical scope of the present disclosure shall be included in the protection scope of the present disclosure. Therefore, the protection scope of the present disclosure shall be subject to the protection scope of the claims.

What is claimed is:

1. An image processing method of a stitching display system, the stitching display system including a control device and Q displays, and Q being a positive integer greater than or equal to 2; and the image processing method comprising:

obtaining, by the control device, at least one frame of initial image;

splitting, by the control device, each initial image into Q first sub-images according to a resolution of each initial image and an arrangement of the Q displays;

outputting, by the control device, the Q first sub-images obtained by splitting each initial image to the Q displays; and displaying, by each display, a first sub-image obtained by the each display according to a physical resolution of the each display;

wherein the displaying, by each display, the first sub-image obtained by the each display according to the physical resolution of the each display includes:

directly displaying, by any of the Q displays, a first sub-image obtained by the any of the Q displays in a case where a resolution of the obtained first sub-image is same as a physical resolution of the any of the Q displays; or performing, by the any of the Q displays, resolution conversion on the obtained first sub-image according to the physical resolution of the any of the Q displays to obtain a second sub-image in a case where the resolution of the obtained first sub-image is different from the physical resolution of the any of the displays, wherein a resolution of the second sub-image is same as the physical resolution of the any of the Q displays; and displaying, by the any of the Q displays, the second sub-image;

wherein the resolution of the obtained first sub-image is M× N, and the physical resolution of the any of the Q displays is $M_0 \times N_0$; and the performing, by the any of the Q displays, the resolution conversion on the obtained first sub-image according to the physical resolution of the any of the Q displays includes:

if M is greater than or equal to $M_0$ ($M \geq M_0$) and N is greater than or equal to $N_0$ ($N \geq N_0$), calculating R1 and R2, and rounding R1 and R2 to obtain R1' and R2'; and R1 being equal to $$\frac{M}{M_0}\left(R1 = \frac{M}{M_0}\right),$$

and R2 being equal to $$\frac{N}{N_0}\left(R2 = \frac{N}{N_0}\right);$$

dividing pixels in the obtained first sub-image based on R1' and R2', so as to obtain $M_0 \times N_0$ pixel groups;

obtaining $M_0 \times N_0$ pieces of second pixel data according to the $M_0 \times N_0$ pixel groups of first pixel data, so as to obtain the second sub-image;

wherein, one pixel group of first pixel data corresponds to one piece of second pixel data; and at least one of the pixel groups includes R1'×R2' adjacent pixels.

2. The image processing method of the stitching display system according to claim 1, wherein the obtaining, by the control device, at least one frame of initial image includes: decapsulating and decoding, by the control device, a video file to read at least one frame of initial image in the video file.

3. The image processing method of the stitching display system according to claim 2, wherein the splitting, by the control device, each initial image into the Q first sub-images according to the resolution of each initial image and the arrangement of the Q displays includes:
splitting, by the control device, each initial image into the Q first sub-images according to the resolution of each initial image and the arrangement of the Q displays, so as to obtain a first sub-image set corresponding to each display, and the first sub-image set corresponding to each display is a set including all first sub-images corresponding to each display of the at least one frame of initial image; and
encoding and encapsulating, by the control device, the first sub-image set corresponding to each display to obtain Q sub-video files; and
the outputting, by the control device, the Q first sub-images obtained by splitting each initial image to the Q displays includes:
outputting, by the control device, the Q sub-video files to corresponding displays respectively.

4. The image processing method of the stitching display system according to claim 3, wherein the displaying, by each display, the first sub-image obtained by the each display according to the physical resolution of the each display includes:
decapsulating and decoding, by each display, a received sub-video file to read a plurality of first sub-images in the sub-video file;
storing, by each display, first sub-images to be displayed;
converting, by each display, resolutions of the stored first sub-images to be displayed according to its own physical resolution, so as to obtain second sub-images and then display them, wherein resolutions of the second sub-images are the same as physical resolutions of corresponding displays.

5. The image processing method of the stitching display system according to claim L, wherein the performing, by the any of the Q displays, the resolution conversion on the obtained first sub-image according to the physical resolution of the any of the Q displays includes:
storing, by the any of the Q displays, the obtained first sub-image in a frame buffer memory; and
performing, by the any of the Q displays, the resolution conversion on the stored first sub-image according to the physical resolution of the any of the Q displays.

6. The image processing method of the stitching display system according to claim 1, wherein the performing, by the any of the Q displays, the resolution conversion on the obtained first sub-image according to the physical resolution of the any of the Q displays includes:
performing, by the any of the Q displays, the resolution conversion on an effective region of the obtained first sub-image according to the physical resolution of the any of the Q displays.

7. The image processing method of the stitching display system according to claim 1, wherein the dividing the pixels in the obtained first sub-image based on R1' and R2' to obtain the $M_0 \times N_0$ pixel groups includes:
in a case where R1' is equal to R1 (R1'=R1), and R2' is equal to R2 (R2'=R2), dividing all pixels in the obtained first sub-image into the $M_0 \times N_0$ pixel groups; and
in a case where R1' is not equal to R1 (R1' #R1) and/or R2' is not equal to R2 (R2' R2), performing image processing on the obtained first sub-image according to a predetermined processing mode, and dividing all pixels in the processed first sub-image into the $M_0 \times N_0$ pixel groups;
wherein the predetermined processing mode includes at least one of following:
adding virtual pixel data into the obtained first sub-image, or,
reducing pixel data in the obtained first sub-image.

8. The image processing method of the stitching display system according to claim 7, wherein the obtaining $M_0 \times N_0$ pieces of second pixel data according to the $M_0 \times N_0$ pixel groups of first pixel data includes at least one of following:
selecting first pixel data of one pixel from a pixel group as a piece of second pixel data corresponding the pixel group; or,
using a weighted average of first pixel data of all pixels in a pixel group as a piece of second pixel data corresponding the pixel group.

9. A non-transitory computer readable storage medium, storing computer instructions, wherein when the computer instructions are executed, the image processing method of the stitching display system according to claim 1 is performed.

10. An image processing method of a stitching display system, the stitching display system including a control device and Q displays, and Q being a positive integer greater than or equal to 2; and the image processing method comprising:
obtaining, by the control device, at least one frame of initial image;
splitting, by the control device, each initial image into Q first sub-images according to a resolution of each initial image and an arrangement of the Q displays;
outputting, by the control device, the Q first sub-images obtained by splitting each initial image to the Q displays; and
displaying, by each display, a first sub-image obtained by the each display according to a physical resolution of the each display;
wherein the displaying, by each display, the first sub-image obtained by the each display according to the physical resolution of the each display includes:
directly displaying, by any of the Q displays, a first sub-image obtained by the any of the Q displays in a case where a resolution of the obtained first sub-image is same as a physical resolution of the any of the Q displays; or
performing, by the any of the Q displays, resolution conversion on the obtained first sub-image according to the physical resolution of the any of the Q displays to obtain a second sub-image in a case where the resolution of the obtained first sub-image is different from the physical resolution of the any of the displays, wherein a resolution of the second sub-image is same as the physical resolution of the any of the Q displays; and
displaying, by the any of the Q displays, the second sub-image;
wherein the resolution of the obtained first sub-image is M×N, and the physical resolution of the any of the Q displays is $M_0 \times N_0$; and
the performing, by the any of the Q displays, the resolution conversion on the obtained first sub-image according to the physical resolution of the any of the Q displays includes:
if M is less than $M_0$ ($M < M_0$) and N is less than $N_0$ ($N < N_0$), expanding M rows of first pixels in the obtained first sub-image to $M_0$ rows of second pixels, and expanding N columns of first pixels in the obtained first sub-image to $N_0$ columns of second pixels.

11. The image processing method of the stitching display system according to claim 10, wherein the expanding the M rows of first pixels in the obtained first sub-image to the $M_0$ rows of second pixels includes:

calculating D1, and rounding D1 to obtain D1', and D1 being equal to $$\frac{M_0}{M}\left(D1 = \frac{M_0}{M}\right);$$

in a case where D1 is equal to D1' (D1=D1'), inserting (D1'−1) newly-added pixels before or after each first pixel in each column, and the $M_0$ rows of second pixels including M rows of first pixels and ($M_0$−M) rows of newly-added pixels;

in a case where D1 is not equal to D1' (D1≠D1') and D1 is rounded up to obtain D1', inserting (D1'−1) newly-added pixels before or after each of A1 first pixels in each column; A1=($M_0$−M)/(D1'−1), and the $M_0$ rows of second pixels including M rows of first pixels and ($M_0$−M) rows of newly-added pixels; or in a case where D1 is not equal to D1' (D1≠D1') and D1 is rounded down to obtain D1', inserting ($M_0$−M×D1') virtual pixels before a first pixel at beginning in each column or after a first pixel at last in each column, pixel data of the virtual pixels being same as pixel data of a first pixel which is most proximate to the virtual pixels or being 0; and inserting (D1'−1) newly-added pixels before or after each first pixel in each column; and the $M_0$ rows of second pixels including M rows of first pixels, ($M_0$−M×D1') rows of virtual pixels, and (M×D1'−M) rows of newly-added pixels; and any of the newly-added pixels being obtained based on any of following: pixel data of a first pixel corresponding to the any of the newly-added pixels, or a weighted average of pixel data of two adjacent first pixels corresponding to the any of the newly-added pixels.

12. The image processing method of the stitching display system according to claim 10, wherein the expanding the N columns of first pixels in the obtained first sub-image to the $N_0$ columns of second pixels includes:

calculating D2, and rounding D2 to obtain D2', and D2 being equal to $$\frac{N_0}{N}\left(D2 = \frac{N_0}{N}\right);$$

in a case where D2 is equal to D2' (D2=D2'), inserting (D2'−1) newly-added pixels before or after each first pixel in each row, and the No columns of second pixels including N columns of first pixels and ($N_0$−N) columns of newly-added pixels;

in a case where D2 is not equal to D2' (D2 #D2') and D2 is rounded up to obtain D2', inserting (D2'− 1) newly-added pixels before or after each of A2 first pixels in each row; A2=($N_0$− N)/(D2'− 1), and the No columns of second pixels including N columns of first pixels and ($N_0$− N) columns of newly-added pixels; or in a case where D2 is not equal to D2' (D2 #D2') and D2 is rounded down to obtain D2', inserting ($N_0$− N×D2') virtual pixels before a first pixel at beginning in each row or after a first pixel at last in each row, pixel data of the virtual pixels being same as pixel data of a first pixel which is most proximate to the virtual pixels or being 0; and inserting (D2'− 1) newly-added pixels before or after each first pixel in each row; and the No columns of second pixels includes N columns of first pixels, ($N_0$− N×D2') columns of virtual pixels, and (N×D2'− N) columns of newly-added pixels; and any of the newly-added pixels being obtained based on any of following: pixel data of a first pixel corresponding to the any of the newly-added pixels, or a weighted average of pixel data of two adjacent first pixels corresponding to the any of the newly-added pixels.

13. A stitching display system, comprising:

a control device and Q displays, and Q being a positive integer greater than or equal to 2;

the control device being configured to:
  obtain at least one frame of initial image;
  split each initial image into Q first sub-images according to a resolution of each initial image and an arrangement of the Q displays; and
  output the Q first sub-images obtained by splitting each initial image respectively to the Q displays;

each display being configured to display a first sub-image obtained by the each display according to a physical resolution of the each display;

directly display a first sub-image obtained by the display in a case where a resolution of the obtained first sub-image is same as a physical resolution of the display; or perform resolution conversion on the obtained first sub-image according to the physical resolution of the display to obtain a second sub-image in a case where the resolution of the obtained first sub-image is different from the physical resolution of the display, wherein a resolution of the second sub-image is same as the physical resolution of the display; and display the second sub-image;

wherein the resolution of the obtained first sub-image is M×N, and the physical resolution of the display is $M_0 \times N_0$; and the display is further configured to:
  if M is greater than or equal to $M_0$ (M≥$M_0$) and N is greater than or equal to $N_0$ (N≥$N_0$), calculate R1 and R2, and round R1 and R2 to obtain R1' and R2' and R1 being equal to $$\frac{M}{M_0}\left(R1 = \frac{M}{M_0}\right),$$

and R2 being equal to $$\frac{N}{N_0}\left(R2 = \frac{N}{N_0}\right);$$

divide pixels in the obtained first sub-image based on R1' and R2' to obtain $M_0 \times N_0$ pixel groups;

obtain $M_0 \times N_0$ pieces of second pixel data according to the $M_0 \times N_0$ pixel groups of first pixel data, so as to obtain the second sub-image:

wherein, one pixel group of first pixel data corresponds to one piece of second pixel data; and at least one of the pixel groups includes R1'×R2' adjacent pixels.

14. The stitching display system according to claim 13, wherein
the control device is further configured to decapsulate and decode a video file to read at least one frame of initial image in the video file.

15. The stitching display system according to claim 14, wherein the control device is further configured to:
split each initial image into the Q first sub-images according to the resolution of the each initial image and the arrangement of the Q displays, so as to obtain a first sub-image set corresponding to each display, and the first sub-image set corresponding to each display is a set including all first sub-images corresponding to each display of the at least one frame of initial image;
encode and encapsulate the first sub-image set corresponding to each display to obtain Q sub-video files; and
output the Q sub-video files to corresponding displays, respectively.

16. The stitching display system according to claim 13, wherein the display is further configured to:
store the obtained first sub-image a frame buffer memory; and
perform the resolution conversion on the stored first sub-image according to the physical resolution of the display.

* * * * *

UNITED STATES PATENT AND TRADEMARK OFFICE
CERTIFICATE OF CORRECTION

PATENT NO. : 11,755,271 B2
APPLICATION NO. : 17/376667
DATED : September 12, 2023
INVENTOR(S) : Dongbo Cao et al.

It is certified that error appears in the above-identified patent and that said Letters Patent is hereby corrected as shown below:

In the Claims

Column 29, Lines 38-39 Claim 5:
"The image processing method of the stitching display system according to claim L, wherein" should read "The image processing method of the stitching display system according to claim 1, wherein".

Signed and Sealed this
Twenty-third Day of January, 2024

Katherine Kelly Vidal
*Director of the United States Patent and Trademark Office*